United States Patent [19]

Sarangdhar et al.

[11] Patent Number: 5,555,420
[45] Date of Patent: *Sep. 10, 1996

[54] MULTIPROCESSOR PROGRAMMABLE INTERRUPT CONTROLLER SYSTEM WITH SEPARATE INTERRUPT BUS AND BUS RETRY MANAGEMENT

[75] Inventors: Nitin V. Sarangdhar, Beaverton, Oreg.; P. K. Nizar, El Dorado Hills, Calif.; David G. Carson, Portland, Oreg.

[73] Assignee: Intel Corporation, Santa Clara, Calif.

[*] Notice: The term of this patent shall not extend beyond the expiration date of Pat. No. 5,283,904.

[21] Appl. No.: 175,776

[22] Filed: Dec. 30, 1993

Related U.S. Application Data

[63] Continuation-in-part of Ser. No. 8,074, Jan. 22, 1993, Pat. No. 5,283,904, which is a continuation-in-part of Ser. No. 632,149, Dec. 21, 1990, abandoned.

[51] Int. Cl.$^6$ .............................. G06F 13/26; G06F 9/46
[52] U.S. Cl. .................... 395/739; 395/741; 395/868; 364/241.2; 364/230.2; 364/280.8; 364/240; 364/240.2; 364/DIG 1
[58] Field of Search ...................... 395/725, 275, 395/325, 425, 800, 739, 741, 868, 733; 370/85.2; 340/825.5

[56] References Cited

U.S. PATENT DOCUMENTS

| | | | |
|---|---|---|---|
| 3,905,025 | 9/1975 | Davis et al. | 395/725 |
| 4,250,546 | 2/1981 | Boney et al. | 395/725 |
| 4,271,468 | 6/1981 | Christensen et al. | 395/275 |
| 4,484,264 | 11/1984 | Friedli et al. | 395/200.2 |
| 4,796,176 | 1/1989 | D'Amico et al. | 395/275 |
| 4,866,664 | 9/1989 | Burkhardt, Jr. et al. | 395/200 |
| 4,868,742 | 9/1989 | Gant et al. | 395/325 |
| 5,123,094 | 6/1992 | MacDougall | 395/375 |
| 5,179,707 | 1/1993 | Piepho | 395/725 |
| 5,218,703 | 6/1993 | Fleck et al. | 395/725 |
| 5,428,794 | 6/1995 | Williams | 395/741 |

OTHER PUBLICATIONS

Val Popescu et al., "The Metaflow Architecture," IEEE Micro, pp. 10–13 and 63–73 (Jun. 1991).

*Primary Examiner*—Gopal C. Ray
*Attorney, Agent, or Firm*—Blakely, Sokoloff, Taylor & Zafman

[57] ABSTRACT

A multiprocessor programmable interrupt controller system has an interrupt bus, distinct from the system (memory) bus, for handling interrupt request (IRQ) related messages. Each processor chip has an on-board interrupt acceptance unit (IAU) coupled to the interrupt bus to accept IRQs and to broadcast IRQs that it generates. I/O device interrupt lines are connected to one or more interrupt delivery units (IDUs) that are each coupled to the interrupt bus to broadcast I/O-generated IRQs. The interrupt bus is a synchronous three-wire bus having one clock wire and two wires for data transmission. Arbitration for control of the interrupt bus by the IAUs and IDUs uses one of the data wires. Lowest priority IRQ delivery mode uses a similar one-wire arbitration procedure for determining which IAU has the lowest current priority task running in its associated on-chip processor. A modification to this procedure also provides uniform distribution of IRQs to eligible processors. The actual servicing of the IRQs is done via the system bus. IAU acceptance logic is minimized by allowing retry of a delivered message when the acceptance latches are full. The increase in interrupt bus traffic due to retry is minimized by controlling the time intervals between rebroadcasts of unaccepted IRQs. Exponential timers control this interval so that each succeeding interval is a multiplicative factor, typically 2, greater than the preceding interval.

7 Claims, 19 Drawing Sheets

Address: FEC0_x000
Value After Reset: 0

Value After Reset: 0
ID = 4-bit
r = Reserved

Value After Reset = 000F00vv
vv = Version#

FIG. 8
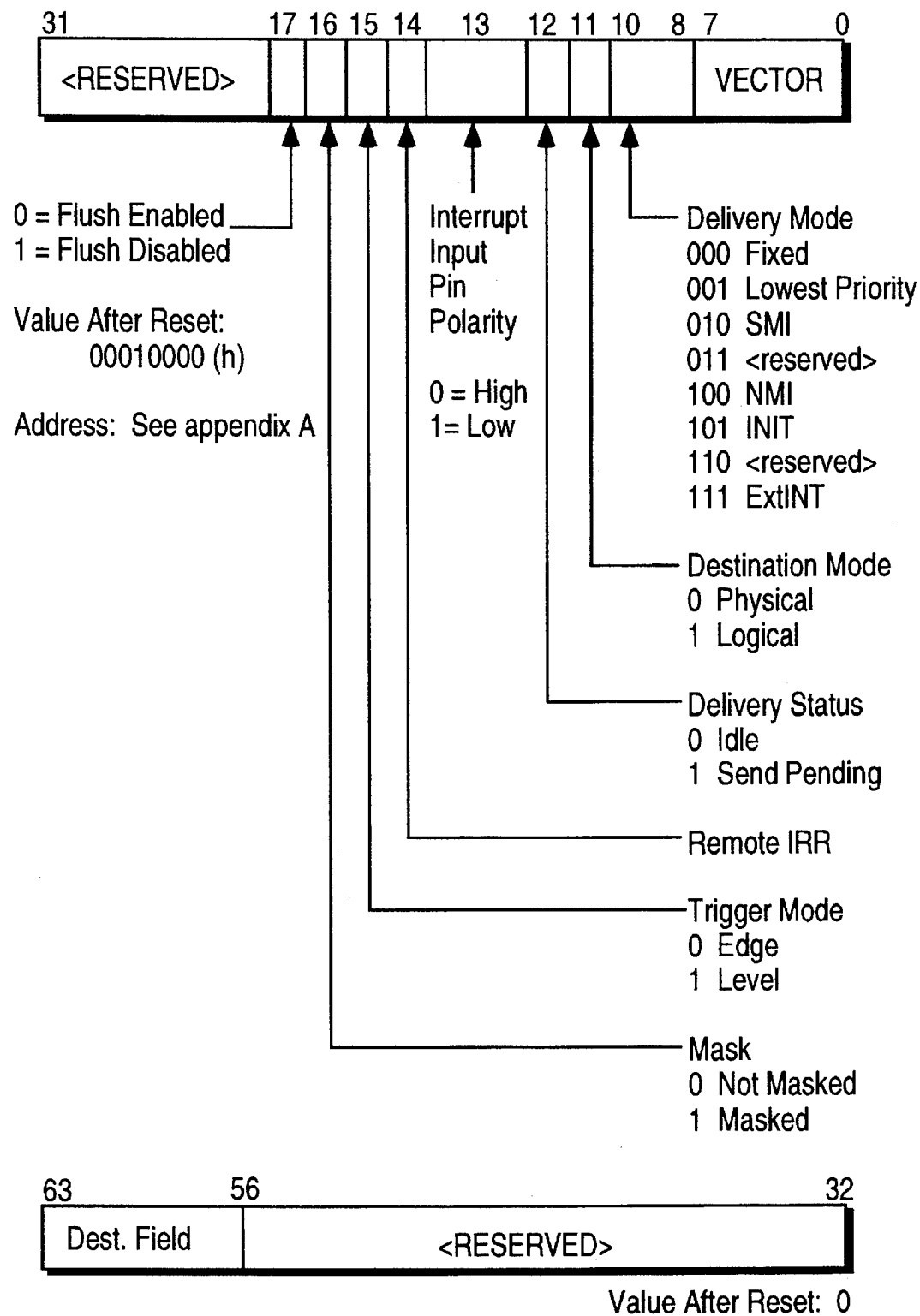
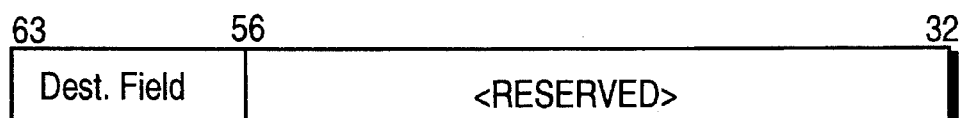

Address: FEE0_0020

0000 = Cluster Mode;
1111 = Flat Mode

Address: FEE0_00E0
Value After Reset: FFFF

Address: FEE0_00D0
Value After Reset: 0000

Address: See Appendix A
Value After Reset: 0

Address: FEE0_0080
Value After Reset: 0

Focus Processor Checking
0: Enabled
1: Disabled

UNIT ENABLED
0: Unit Disabled
1: Unit Enabled

Spurious Vector
Address: FEE0_00F0
Value After Reset: 000000FF

FIG. 19

```
31                                                                    0
┌─────────────────────────────────────────────────────────────────────┐
│ x x x x x x x x x x x x x x x x x x x x x x x x x x x x x x x x   │
└─────────────────────────────────────────────────────────────────────┘
``` x = Don't Care
Address: FEE0_00B0
Value After Reset: 0

Address: FFE0_00C0
Value After Reset: 0

FIG. 21

| 31    24 | 23    16 | 15    8 | 7    0 |
|----------|----------|---------|--------|
| <reserved> | Max. LVT Entry | <reserved> | VERSION |

Value After Reset = 000200vv
vv = Version#
Address: FEE0_0030

FIG. 27

| 31   8 | 7 | 6 | 5 | 4 | 3 | 2 | 1 | 0 |
|--------|---|---|---|---|---|---|---|---|
| <Reserved> | Illegal Reg. Adrs. | Receive Illegal Vector | Send Illegal Vector | <Reserved> | Receive Accept Error | Send Accept Error | Receive CS Error | Send CS Error |

Address: FEE0_0280
Value After Reset: 0

FIG. 22

| Cycle | Bit⁰ | Bit¹ | |
|---|---|---|---|
| 1: | eoi | 1 | 01 = normal, 11 = EOI |
| 2: | ArbID3 | 0 | Arbitration ID bits 3 thru 0 |
| 3: | ArbID2 | 0 | |
| 4: | ArbID1 | 0 | |
| 5: | ArbID0 | 0 | |
| 6: | V7 | V6 | Interrupt vector V9-V0 |
| 7: | V5 | V4 | |
| 8: | V3 | V2 | |
| 9: | V1 | V0 | |
| 10: | C | C | Check Sum |
| 11: | 0 | 0 | Postamble |
| 12: | A | A | Status Cycle 0 |
| 13: | A1 | A1 | Status Cycle 1 |
| 14: | 0 | 0 | Idle |

FIG. 23

| Cycle | Bit⁰ | Bit¹ | |
|---|---|---|---|
| 1: | eoi | 1 | 01 = normal, 11 = EOI |
| 2: | ArbID3 | 0 | Arbitration ID bits 3 thru 0 |
| 3: | ArbID2 | 0 | |
| 4: | ArbID1 | 0 | |
| 5: | ArbID0 | 0 | |
| 6: | DM | M2 | DM = Destination mode |
| 7: | M1 | M0 | M2-M0 = Delivery mode |
| 8: | L | TM | L = Level, TM = Trigger Mode |
| 9: | V7 | V6 | V7-V0 = Interrupt Vector |
| 10: | V5 | V4 | |
| 11: | V3 | V2 | |
| 12: | V1 | V0 | |
| 13: | D7 | D6 | Destination |
| 14: | D5 | D4 | |
| 15: | D3 | D2 | |
| 16: | D1 | D0 | |
| 17: | C | C | Check Sum for cycles 6-16 |
| 18: | 0 | 0 | Postamble |
| 19: | A | A | Status Cycle 0 |
| 20: | A1 | A1 | Status Cycle 1 |
| 21: | 0 | 0 | Idle |

FIG. 24

Status Cycles Decoding

| Delivery Mode | Focus Processor? | Bits A A | Comments | Bits A1 A1 | Comments |
|---|---|---|---|---|---|
| Fixed, EOI | N/A | 0  0 | CS is OK | 1  0 | Accepted |
|  |  |  |  | 1  1 | Retry |
|  |  |  |  | 0  x | Error |
|  |  | 1  1 | CS Error | x  x |  |
|  |  | 1  0 | Error | x  x |  |
|  |  | 0  1 | Error | x  x |  |
| NMI, SMM, Reset, ExtINT | N/A | 0  0 | CS is OK | 1  0 | Accepted |
|  |  |  |  | 1  1 | Error |
|  |  |  |  | 0  x | Error |
|  |  | 1  1 | CS Error | x  x |  |
|  |  | 1  0 | Error | x  x |  |
|  |  | 0  1 | Error | x  x |  |
| Lowest Prior. | No | 0  0 | CS is OK, no Focus Proc. | 1  1 | Go for LP Arbitration |
|  |  |  |  | 1  0 | End and Retry |
|  |  |  |  | 0  x | Error |
|  | Yes | 1  0 | CS is OK, Focus Proc. | x  x |  |
|  |  | 1  1 | CS Error | x  x |  |
|  |  | 0  1 | Error | x  x |  |
| Remote Read | N/A | 0  0 | CS is OK | x  x |  |
|  |  | 1  1 | CS Error | x  x |  |
|  |  | 0  1 | Error | x  x |  |
|  |  | 1  0 | Error | x  x |  |

CS = Check Sum
NA = Not Applicable

FIG. 25

| Cycle | Bit1 | Bit0 | |
|---|---|---|---|
| 1: | eoi | 1 | 01 = normal, 11 = EOI |
| 2: | ArbID3 | 0 | Arbitration ID bits 3 thru 0 |
| 3: | ArbID2 | 0 | |
| 4: | ArbID1 | 0 | |
| 5: | ArbID0 | 0 | |
| 6: | DM | M2 | DM = Destination mode |
| 7: | M1 | M0 | M2-M0 = Delivery mode |
| 8: | L | TM | L = Level, TM = Trigger Mode |
| 9: | V7 | V6 | V7-V0 = Interrupt Vector |
| 10: | V5 | V4 | |
| 11: | V3 | V2 | |
| 12: | V1 | V0 | |
| 13: | D7 | D6 | Destination |
| 14: | D5 | D4 | |
| 15: | D3 | D2 | |
| 16: | D1 | D0 | |
| 17: | C | C | Check Sum for cycles 6-16 |
| 18: | 0 | 0 | Postamble |
| 19: | A | A | Status Cycle 0 |
| 20: | A1 | A1 | Status Cycle 1 |
| 21: | P7 | 0 | Inverted Processor Priority P7-P0 |
| 22: | P6 | 0 | |
| 23: | P5 | 0 | |
| 24: | P4 | 0 | |
| 25: | P3 | 0 | |
| 26: | P2 | 0 | |
| 27: | P1 | 0 | |
| 28: | P0 | 0 | |
| 29: | ArbID3 | 0 | Arbitration ID 3-0 |
| 30: | ArbID2 | 0 | |
| 31: | ArbID1 | 0 | |
| 32: | ArbID0 | 0 | |
| 33: | 0 | 0 | Idle |

FIG. 26

| Cycle | Bit0 | Bit1 | |
|---|---|---|---|
| 1: | eoi | 1 | 01 = normal, 11 = EOI |
| 2: | ArbID3 | 0 | Arbitration ID bits 3 thru 0 |
| 3: | ArbID2 | 0 | |
| 4: | ArbID1 | 0 | |
| 5: | ArbID0 | 0 | |
| 6: | DM | M2 | DM = Destination mode |
| 7: | M1 | M0 | M2-M0 = Delivery mode |
| 8: | L | TM | L = Level, TM = Trigger Mode |
| 9: | V7 | V6 | V7-V0 = Interrupt Vector |
| 10: | V5 | V4 | |
| 11: | V3 | V2 | |
| 12: | V1 | V0 | |
| 13: | D7 | D6 | Destination |
| 14: | D5 | D4 | |
| 15: | D3 | D2 | |
| 16: | D1 | D0 | |
| 17: | C | C | Check Sum for cycles 6-16 |
| 18: | 0 | 0 | Postamble |
| 19: | A | A | Status Cycle 0 |
| 20: | A1 | A1 | Status Cycle 1 |

| Cycle | Bit0 | Bit1 | |
|---|---|---|---|
| 21: | d31 | d30 | Remote Register Data |
| 22: | d29 | d28 | |
| 23: | d27 | d26 | |
| 24: | d25 | d24 | |
| 25: | d23 | d22 | |
| 26: | d21 | d20 | |
| 27: | d19 | d18 | |
| 28: | d17 | d16 | |
| 29: | d15 | d14 | |
| 30: | d13 | d12 | |
| 31: | d11 | d10 | |
| 32: | d09 | d08 | |
| 33: | d07 | d06 | |
| 34: | d05 | d04 | |
| 35: | d03 | d02 | |
| 36: | d01 | d00 | |
| 37: | S | S | Data Status: 11 = valid, 00 = invalid |
| 38: | C | C | Check Sum for data d31-d00 |
| 39: | 0 | 0 | Idle |

MULTIPROCESSOR PROGRAMMABLE INTERRUPT CONTROLLER SYSTEM WITH SEPARATE INTERRUPT BUS AND BUS RETRY MANAGEMENT

CROSS-REFERENCE TO RELATED APPLICATIONS

This is a continuation-in-part of application Ser. No. 08/008,074, filed Jan. 22, 1993, which issued on Feb. 1, 1994 as U.S. Pat. No. 5,283,904, which is a continuation-in-part of application Ser. No. 07/632,149, filed Dec. 21, 1990, now abandoned.

FIELD OF THE INVENTION

This invention relates to the management of interrupt request messages in a multiprocessor system using a separate interrupt bus and introducing exponentially increasing intervals between repeated (retry) interrupt request messages.

BACKGROUND OF THE INVENTION

Input/output peripheral equipment, including such computer items as printers, scanners, and display devices, require intermittent servicing by a host processor in order to ensure proper functioning. Services, for example, may include data deliver, data capture, and/or control signals. Each peripheral will typically have a different servicing schedule that is not only dependent on the type of device but also on its programmed usage. The host processor is required to multiplex its servicing activity amongst these devices in accordance with their individual needs while running one or more background programs. Two methods for advising the host of a service need have been used: polled device and device interrupt methods. In the former method, each peripheral device is periodically checked to see if a flag has been set indicating a service request, while, in the latter method, the device service request is routed to an interrupt controller that can interrupt the host, forcing a branch from its current program to a special interrupt service routine. The interrupt method is advantageous because the host does not have to devote unnecessary clock cycles for polling. It is this latter method that the present invention addresses. The specific problem addressed by the current invention is the management of interrupts in a multiprocessor system environment.

Multiprocessor systems, often a set of networked computers having common peripheral devices, create a challenge in the design of interrupt control methods. For instance, in the case of a computer network servicing a number of users, it would be highly desirable to distribute the interrupt handling load in some optimum fashion. Processors that are processing high priority jobs should be relieved of this obligation when processors with lower priority jobs are available. Processors operating at the lowest priority should be uniformly burdened by the interrupt servicing requests. Also, special circumstances may require that a particular I/O device be serviced exclusively by a preselected (or focus) processor. Thus, the current invention addresses the problem of optimum dynamic and static interrupt servicing in multiprocessor systems.

Prior art, exemplified by Intel's 82C59A and 82380 programmable interrupt controllers (PICs), are designed to accept a number of external interrupt request inputs. The essential structure of such controllers, shown in FIG. 1, consists of six major blocks:

IRR: Interrupt Request Register 11 stores all interrupt levels (IRQx) on lines 16 requesting service;

ISR: Interrupt Service Register 12 stores all interrupt levels which are being serviced, status being updated upon receipt of an end-of-interrupt (EOI);

IMR: Interrupt Mask Register 13 stores the bits indicating which IRQ lines 16 are to be masked or disabled by operating on IRR 11, VR: Vector Registers 19, a set of registers, one for each IRQ line 16, stores the preprogrammed interrupt vector number supplied to the host processor on data bus 17, containing all the necessary information for the host to service the request;

PR: Priority Resolver 15, a logic block that determines the priority of the bits set in IRR 11, the highest priority is selected and strobed into the corresponding bit of ISR 12 during an interrupt acknowledge cycle (INTA) from the host processor;

Control Logic: Coordinates the overall operations of the other internal blocks within the same PIC, activates the host input interrupt (INT) line 21 when one or more bits of IRR 11 are active, enables VR 19 to drive the interrupt vector onto data bus 17 during an INTA cycle, and inhibits all interrupts with priority equal or lower than that being currently serviced.

Several different methods have been used to assign priority to the various IRQ lines 16, including:

1) fully nested mode,
2) automatic rotation equal priority devices mode and
3) specific rotation-specific priority mode.

The fully nested mode supports a multilevel interrupt structure in which all of the IRQ input lines 16 are arranged from highest to lowest priority: typically IRQ0 is assigned the highest priority, while IRQ7 is the lowest.

Automatic rotation of priorities when the interrupting devices are of equal priority is accomplished by rotating (circular shifting) the assigned priorities so that the most recently served IRQ line is assigned the lowest priority. In this way, accessibility to interrupt service tends to be statistically leveled for each of the competing devices.

The specific rotation method gives the user versatility by allowing the user to select which IRQ line is to receive the lowest priority. All other IRQ lines are then assigned sequentially (circularly) higher priorities.

From the foregoing description, it may be seen that PIC structures of the type described accommodate uniprocessor systems with multiple peripheral devices but do not accommodate multiprocessor systems with multiple shared peripheral devices to which the present invention is addressed.

SUMMARY OF THE INVENTION

It is the object of the current invention to provide a multiprocessor programmable interrupt controller (MPIC) system including, but not limited to, the following capabilities:

1) a separate Interrupt Bus, distinct from the memory (or system) bus, for communication of interrupt request (IRQ) and IRQ receipt acknowledgment signals, and for IRQ service arbitration between eligible servers;

2) interrupt servicing of multiple I/O peripheral subsystems, each with its own set of interrupt lines;

3) static as well as dynamic multiprocessor interrupt management;

4) programmable interrupt vector and steering information for each IRQ pin;

5) interprocessor interrupts allowing any processor to interrupt any other for dynamic reallocation of interrupt tasks;

6) operating system defined programmable reallocation of interrupt tasks;

7) support of system-wide functions related to non-maskable interrupt (NMIs), processor reset, and system debugging; and 8) an apparatus and method for reducing interrupt bus traffic, caused by the rebroadcasting of unaccepted interrupt request messages, by introducing exponentially increasing time intervals between each successive retry. The present invention achieves these capabilities by means of a MPIC system structure that includes three major subsystem components:

1) an Interrupt Bus, separate and distinct from the memory (system) bus;

2) an I/O interrupt delivery unit (IDU) connected to the Interrupt Bus and to a set of IRQ pins, having a redirection table for processor selection and interrupt priority and vector information; and 3) a processor associated interrupt acceptance unit (IAU) connected to the Interrupt Bus for managing interrupt requests for a specific system processor including acceptance acknowledgment, IRQ pending, nesting and masking operations, and interprocessor interrupt management.

More specifically, the present invention uses a three-wire synchronous interrupt bus: two wires for data, one wire for the clock, and one of the two data wires for bus and lowest priority arbitration.

Whenever an interrupt is not accepted by any qualified agent on the interrupt bus, the agent requesting interrupt servicing could repeatedly broadcast the request as often as it may gain control of the interrupt bus and thus cause a significant increase in bus traffic. A method and apparatus of the present invention eliminates the incessant "hogging" of the interrupt bus by introducing ever increasing time delays between repeated interrupt servicing requests thereby providing the following system benefits:

1) reduction of average interrupt latency;

2) increased effective interrupt bus bandwidth; and 3) reduced power consumption in power-consumption-sensitive systems.

BRIEF DESCRIPTION OF THE DRAWINGS

The present invention may be understood more fully from the detailed description given below and from the accompanying drawings of the preferred embodiments of the invention which, however, should not be taken to limit the invention to the specific embodiment but are for explanation and understanding only.

FIG. 8 shows the Redirection Table Entry bit assignment layout.

FIG. 19 shows the IAU End-of-Interrupt register bit assignment.

FIG. 20 shows the IAU Remote Register.

FIG. 21 shows the IAU Version Register bit assignment.

FIG. 22 shows the EOI priority message format for level-triggered interrupts.

FIG. 23 shows the short message format.

FIG. 24 shows the IAU Interrupt Bus Status cycles decoding.

FIG. 25 shows the lowest priority without focus processor message format.

FIG. 26 shows the Remote Read message format.

FIG. 27 shows the IAU Error Status Register bit assignment.

DESCRIPTION OF PREFERRED EMBODIMENT(S)

A multiprocessor programmable interrupt controller (MPIC) is described. In the following description, numerous specific details are set forth, in order to provide a thorough understanding of the preferred embodiment of the present invention. However, it will be apparent to one skilled in the an that the present invention may be practiced without these specific details. Also, well-known circuits have not been shown in detail, or have been shown in block diagram form, in order to avoid unnecessarily obscuring the present invention.

Additionally, in describing the present invention, reference is made to signal names peculiar to the currently preferred embodiment. Reference to these specific names should not be construed as a limitation on the spirit or scope of the present invention.

A. Overview of the Architecture

The multiprocessor programmable interrupt controller (MPIC) system is designed to accommodate interrupt servicing in a multiprocessor environment. Current practice is mainly concerned with uniprocessor systems in which the interrupt of a number of peripheral units are serviced by a single processor aided by a programmable interrupt controller (PIC). In a multiprocessor, it is often desirable to share the burden of interrupt servicing among the group of similar processes. This implies the ability to broadcast interrupt service requests to the pertinent group of processes and a mechanism for determining the equitable assignment of the tasks amongst the processors. The uniprocessor design problem is significantly simpler: the PIC dedicated to the processor assigns a priority to each interrupt request (IRQ) line, orders the request according to the assigned priorities and delivers the necessary information to the processor to timely initiate the appropriate servicing subroutine.

The MPIC system provides both static and dynamic interrupt task assignment to the various processors. When operating in a purely static mode, it functions much as a PIC in a uniprocessor system assigning each interrupt according to a prescribed schedule.

When operating in a dynamic mode, the MPIC manages interrupt task assignments by taking into consideration the relative task priority between the processors.

It is expected that more typical usage would entail elements of both static and dynamic interrupt management. Static assignment might be made, for example, when licensing considerations preclude the shared use of servicing software. Under other circumstances, it may be desirable to restrict the interrupt servicing task to a subset of processors that share a common peripheral subsystem. In the extreme case, all processors are subject to interrupt requests from all peripheral subsystems.

Figure 1:
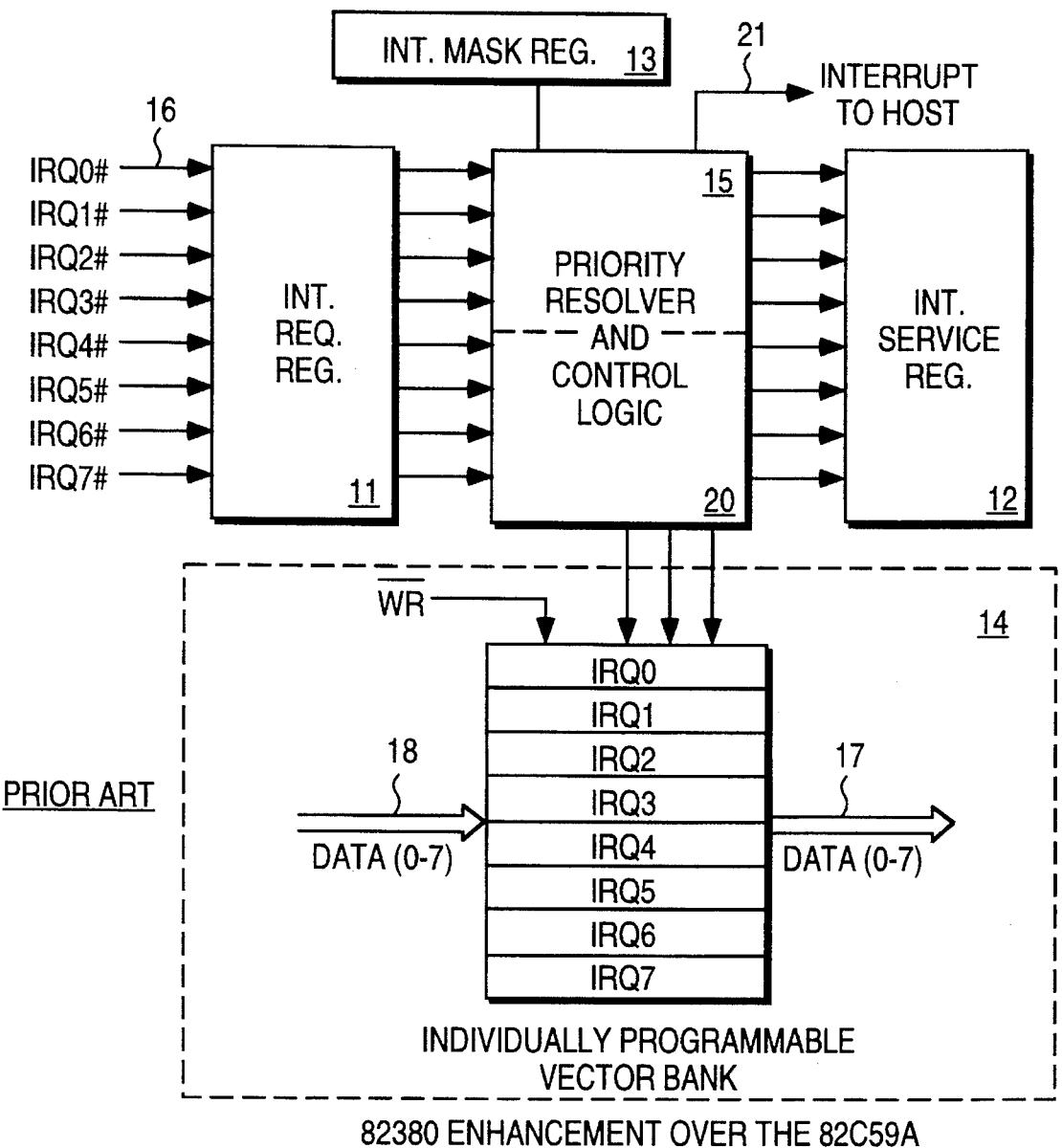
FIG. 1 depicts a block diagram of a common prior art uniprocessor programmable interrupt controller.
Figure 2:
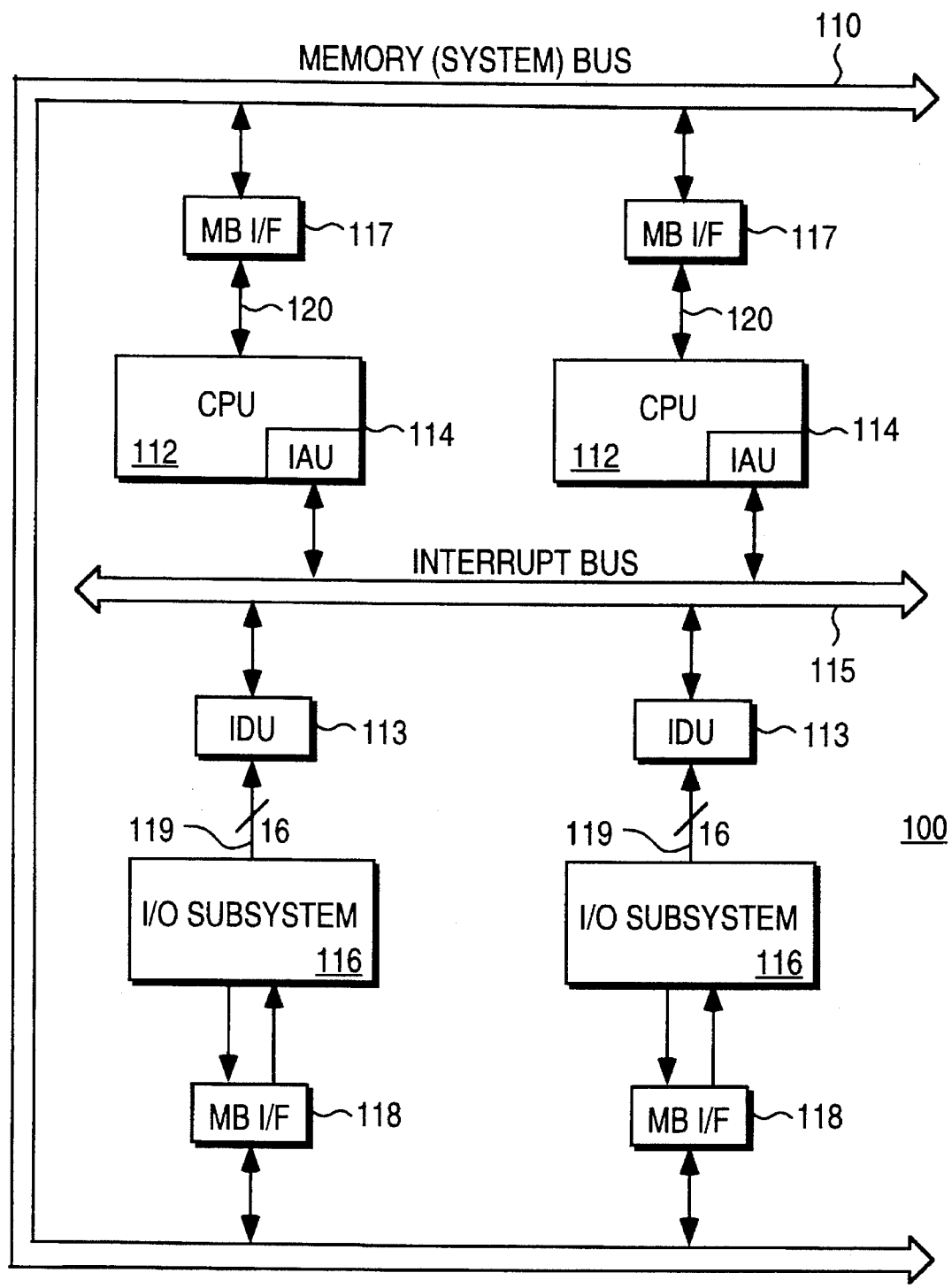
FIG. 2 is a block diagram of the preferred multiprocessor programmable interrupt controller (MPIC) system.

FIG. 2 is a block diagram of the preferred MPIC system 100. It consists of four major parts: a Memory (or System) Bus 110; an Interrupt Bus 115 which is distinct from memory bus 110; a multiplicity of processor units (CPUs) 112 interfaced to Memory Bus 110 by Memory Bus Interface (MBI/F) 117 and to Interrupt Bus 115 by Interrupt Acceptance Units (IAUs) 114; and at least one I/O Subsystem 116 interfaced to Memory Bus 110 by Memory Bus Interface (MBI/F) 118 and to Interrupt Bus 115 by Interrupt Delivery Unit (IDU) 113.

I/O subsystem 116 may be a single device with multiple interrupt request (IRQ) lines connecting to IDU 113 or a collection of devices, each with one or more IRQ lines 119. In the preferred embodiment, each IDU 113 may accommodate up to 16 IRQ input lines. Consequently, MBI/F 118 may be a single or multiple interface unit for coupling I/O Subsystems 116 to Memory Bus 110.

In the preferred embodiment, IAU 114 is resident on the CPU 112 chip for more efficient signal coupling. Also, MBI/F 117 may be unnecessary if the CPU Bus 120 protocol is compatible with that of Memory Bus 110.

It is important to recognize that the architecture of FIG. 2 provides Interrupt Bus 115 for routing of interrupt-related control messages between system elements, thus reducing the traffic that must be carried by Memory Bus 110. Memory Bus 110 is only used for the actual servicing of the IRQ and is not required for IRQ arbitration, assignment, and acceptance acknowledgment.

Each IDU accepts up to 16 IRQs on input lines 119 and broadcasts to all IAUs 114 over Interrupt Bus 115 an appropriately formatted IRQ message for each active IRQ input line. The IRQ message contains all necessary information for identifying the IRQ source and its priority.

Each IAU 114 examines the broadcast message and decides whether to accept it. If the IRQ message is tentatively accepted by more than one IAU, and arbitration procedure is invoked between competing units. The IAU with the lowest priority wins the arbitration and accepts the IRQ, pending delivery to its associated CPU. Also, IAU 114 provides nesting and masking of interrupts and handles all interactions with its local processor including the CPU protocol for interrupt request (INTR), interrupt acknowledge (INTA), and end of interrupt (EOI).

An undesirable consequence of incorporating the IAU onto the CPU chip may be the potential increase in pin-circuit needed to accommodate the added circuitry. This requirement for added pins has been relieved by reducing the width of the interrupt data bus to 2 bits and increasing the number of clocks required to deliver an interrupt request-related message.

In order to minimize the additional on-chip silicon area required for the IAU circuitry, the interrupt vector address was limited to 4 bits and priority class information was limited to 3 bits. Also, the number of interrupt requests stored per priority class was limited to two. This latter restriction substantially reduced on-chip area requirements but at the expense of increasing interrupt bus traffic because of the increased number of retry broadcasts required before an IAU, with the limited storage for queued interrupt requests, is found that is eligible to handle the request and that has storage available for queuing the request.

IAU 114 not only accepts IRQs broadcast on Interrupt Bus 114 but can generate interprocessor interrupts. It further provides a timer to its associated CPU.

B. Interrupt Control

The interrupt control function of all IDUs 113 and IAUs 114 is collectively responsible for delivering interrupts from interrupt sources to interrupt destinations in the multiprocessor system. An interrupt is an event that indicates that a certain condition somewhere in the system requires the attention of one or more processors in order to deal with this condition. The action taken by a processor in response to an interrupt is referred to as servicing the interrupt or handling the interrupt.

Each interrupt in the system has an identity that distinguishes the interrupt from other interrupts in the system. This identity is commonly referred to as the vector of the interrupt. The vector allows the processor to find the fight handler for the interrupt. When a processor accepts an interrupt, it uses the vector to locate the entry point of the handler in its interrupt table. The architecture supports 240 distinct vectors with values in the range 16 to 255.

Each interrupt has an interrupt priority that determines the timeliness with which the interrupt should be serviced relative to the other activities of the processors. The architecture allows for 16 possible interrupt priorities: zero being the lowest priority and 15 being the highest. A value of 15 in Task Priority Register (TPR) will mask off all interrupts which require interrupt vectors. Priority of interrupt A "is higher than" the priority of interrupt B if servicing A is more urgent than servicing B. An interrupt's priority is implied by its vector; namely, priority=Vector/16.

Sixteen different interrupt vectors can share a single interrupt priority.

Because each IAU 114 can only keep pending two interrupts in a given priority class, it is preferred that the number of interrupts in a class be limited to two when only a single CPU is operating. However, for a multiprocessor processor operation with a number, N, of CPUs functioning, the preferred number of pended interrupts per class is N/2.

Typically, a priority model would organize the interrupt priorities from high (15) to low (0) as follows:

| | Type of Interrupt | |
|---|---|---|
| Priority | Class 1 | Class 2 |
| 15 | Ststem Event | System Event |
| 14 | Interprocessor | Interprocessor |
| 13 | Local CPU | Local CPU |
| 12 | Timer | Timer |
| 11-2 | I/O | I/O |
| 1 | Application Procedure Call | Delayed Procedure Call |
| 0 | Reserved | Reserved |

Thus, system events requiting urgent attention, such as power failure, etc., have the highest priority, followed by interprocessor (CPU)interrupts, local CPU related interrupts, IAU timer interrupts, I/O interrupts, and procedure call related interrupts. In this example, priority 0 is not used.

IRQs are generated by a number of sources within the multiprocessor system including: external (I/O) devices, local (to CPU) devices, IAU 114 timers, and CPUs. IRQs from I/O or devices local to a CPU may activate their Interrupt Lines 119 by using either signal edge transitions or signal levels. IAU timers generate an on-chip internal interrupt. A CPU may interrupt another CPU or sets of CPUs in support of software self-interrupts, preemptive scheduling, Table Look-aside Buffer (TLB) flushing, and interrupt forwarding. A processor generates interrupts by writing to the Interrupt Command Register (ICR) in its local IAU.

C. IDU Structure

Figure 3:
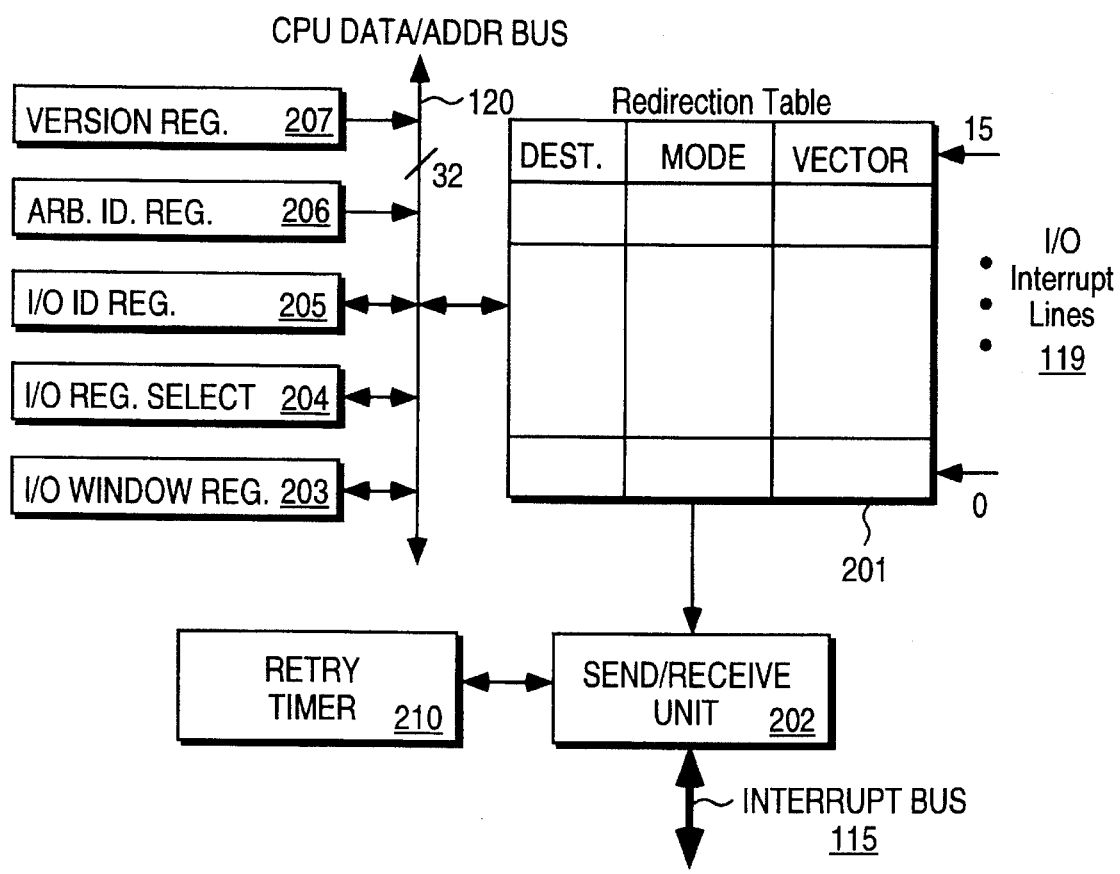
FIG. 3 shows the architecture of an Interrupt Delivery Unit (IDU).

IDU 114, shown in FIG. 3, consists of a set of IRQ pins for accepting I/O Interrupt Lines 119, an Interrupt Redirection Table 201, and a Message Unit 202 for sending and receiving interrupt control related messages from Interrupt Bus 115. The Redirection Table has a Destination (DEST) mode, and vector entry for each of the 16 I/O interrupt lines. Activating an Interrupt Line selects the corresponding table entry and delivers it to Send/Receive Unit 202 for formatting an appropriate IRQ message for broadcast on Interrupt Bus 115. The contents of Redirection Table 201 is under software control. Each table entry register is 64 bits wide. All registers are accessed using 32-bit reads and stores. Each IDU 114 is located at a unique address.

In addition, each IDU 114 has five 32-bit I/O Registers (203–207).

Figure 4:
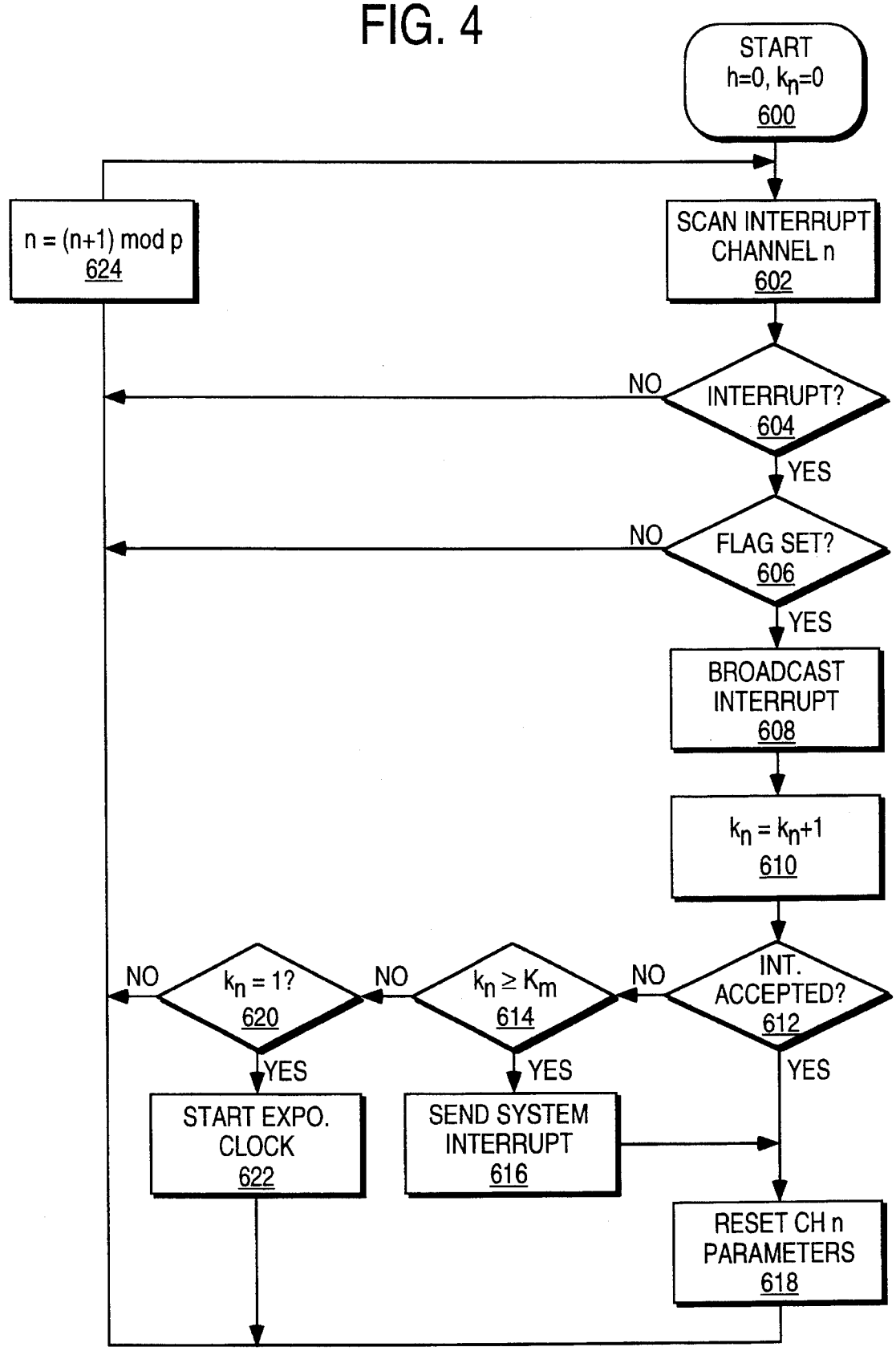
FIG. 4 is a flowchart describing the IDU retry procedure.
Figure 5:
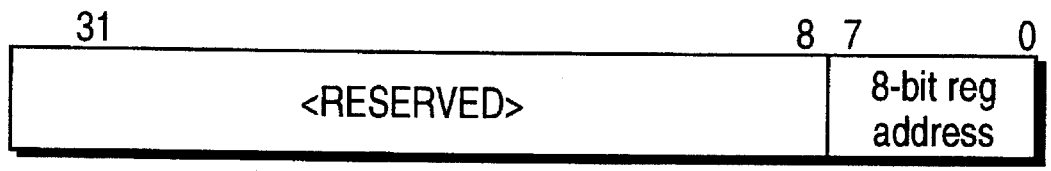
FIG. 5 shows the I/O Select Register bit assignment.

Select Register 204 selects which I/O register's contents is to appear in Window Register 203 by a software write to the lower 8 bits (bits 0–7), as shown in FIG. 4. This permits software manipulation of the contents of the other four I/O Registers.

Window Register 203 is mapped onto the register selected by Select Register 204.

Figure 6:
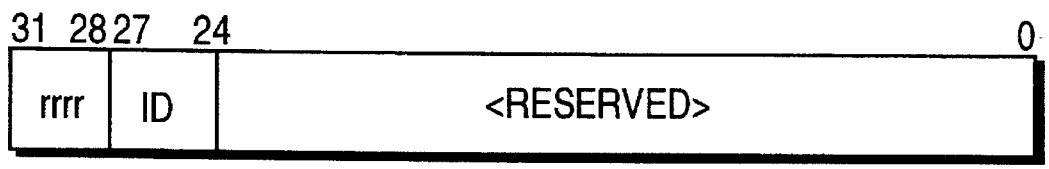
FIG. 6 shows the I/O ID Register bit assignment.

ID Register 205 contains the IDU 4-bit identification code which serves as the physical name of the IDU. Each IDU is assigned a unique name (ID). The bit assignment is shown in FIG. 6. At power-up, it is reset to zero. Its contents must be supplied by software before use.

Arbitration Register 206 contains the bus arbitration priority for the IDU. Its initial contents are derived from the ID in ID Register 205. A rotating priority scheme is used for Interrupt Bus arbitration wherein the winner of the arbitration becomes the lowest priority agent and assumes an arbitration ID of zero. All other bus agents, except the agent whose arbitration ID is 15, increment their ID by one. The agent with ID=15 takes the winner's ID and increments it by one. Arbitration IDs are adjusted only for messages that are transmitted successfully. Successfully transmitted means no CS error or acceptance error was reported for that message. Arbitration register 206 is loaded with contents of ID register 205 during a level-triggered INIT with deassert message.

Figure 7:
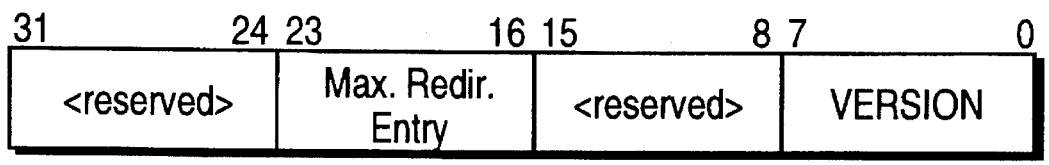
FIG. 7 shows the I/O Version Register bit assignment.

Version Register 207 identifies implementation versions of the IDU. The register bit map of FIG. 7 shows that bits 0–7 are assigned to the version number and are hardwired, read-only. Bits 16–23 represent the maximum assigned vector index value, $n_{max}$, of redirection table 201. Each IDU can accept up to 16 interrupt lines, and each MPIC system can accommodate 240 interrupt vectors ($0 \leq n \leq 239$) so that, for a full capacity system with 15 IDUs, $n_{max}$=15, 31, 47, 63, ..., 224, 239 with one $n_{max}$ assigned to each IDU's Version Register 207.

The Redirection Table 201 has a dedicated entry for each interrupt input pin. The notion of interrupt priority is completely unrelated to the position of the physical interrupt input pin on the IDU. Instead, software can decide for each pin individually what it wants the vector (and therefore the priority) of the corresponding interrupt to be. For each individual pin, the operating system can also specify the signal polarity (low active or high active), whether the interrupt is signaled as edges or levels, as well as the destination and delivery mode of the interrupt. The information in the Redirection Table is used to translate the interrupt manifestation on the corresponding interrupt pin into a MPIC system message.

Send/Receive Logic Unit 202 scans the I/O interrupt lines sequentially (from top to bottom) in a circular fashion. When it sees an interrupt active and its delivery status bit is set (i.e., send pending), it will transmit that interrupt onto the Interrupt Bus 115. If that interrupt is not accepted by any IAU because its holding register is busy, or because of a check sum error, or a no response error, logic unit 202 does not reset its delivery status bit to idle for that interrupt but goes to the next interrupt line and continues scanning. The IDU goes back to the interrupt which needs a "retry" only when its turn comes up again.

Repeated message retrys on the Interrupt Bus may result in an undesirable loss in traffic capacity. Retrys resulting from nonacceptance of interrupt messages by the destination IAU because of the nonavailability of holding buffer space are limited in their access to the Interrupt Bus by introducing waiting intervals between retry attempts that increase at an exponential rate.

Send/Receive Logic Unit 202 of FIG. 3 repeatedly scans I/O Interrupt Lines 119. Any interrupt request that must be retried initiates an exponential counter in Retry Timer Unit 210 which is implemented using a chain of synchronous binary counters using a constant time base. The first delay (IDU clock period) is a unit time delay which is software-configurable (1 μs to 1 second). The next interval is triggered by the output of a divide-by-two counter. The next is triggered by a divide-by-four counter resulting in four units of delay, and so on, until the $m^{th}$ interval is triggered by the output of a divide by $2^m$ counter. Each of the triggers sets a common flip-flop (flag) which Send/Receive Logic Unit 202 of IDU 114 scans simultaneously with the scanning of I/O Interrupt Lines 119. If a particular I/O interrupt line is not a retry, the flag is set once each IDU clock period and then reset by Send/Receive Logic Unit 202 after acceptance of a broadcast interrupt request or if no interrupt request is present on the interrupt line being scanned. If a particular I/O interrupt line message is a retry, the flag is set by using the exponentially spaced triggers of the Retry Timer Unit 210 counters. If Send/Receive Logic Unit 202 finds that the flag is set, it will try to deliver (broadcast) the interrupt message (Destination, Mode, and Vector) of the corresponding I/O interrupt line. If the flag is not set, the Send/Receive Logic does not broadcast any corresponding I/O interrupt line message but passes onto the next line in its prescribed scanning routine. Each time a flag is read, it is cleared (reset). If a retry is accepted, the binary counters are reset and the flag is reset each IDU clock period until a retry reoccurs.

A maximum limit on the number of retrys (m) can be set by system configuration software so that, if the limit is reached or exceeded, an interrupt may be activated advising the host of the undelivered IRQ.

A synchronous m-bit binary counter with output bits $A_0$, $A_1, A_2, \ldots, A_{m-1}$, (where $A_0$ is the lsb), together with simple combinatorial logic may be used to generate the exponentially spaced triggers by implementing the following Boolean logic statement:

$$\text{TRIGGER} = A_0 \cdot \bar{A}_1 \cdot \bar{A}_2 \ldots \bar{A}_{m-1} + A_0 \cdot A_1 \cdot \bar{A}_2 \ldots \bar{A}_{m-1} +$$
$$\ldots + A_0 \cdot A_1 \cdot A_2 \ldots A_{m-3} \cdot \bar{A}_{m-2} \cdot \bar{A}_{m-1} + A_0 \cdot A_1 \cdot$$
$$A_2 \ldots A_{m-2} \cdot \bar{A}_{m-1} + A_0 \cdot A_1 \cdot A_2 \ldots A_{m-2} \cdot A_{m-1}$$

where (•) indicates AND, (+) indicates OR, and $\bar{A}$ is the complement of A. This logic will produce triggers at times corresponding to $1, 3, 7, 15, \ldots, 2^m-1$ having the required exponentially spaced intervals.

FIG. 4 is a flowchart describing the IDU retry procedure 600. The process initializes the channel index (n=0) and the $n^{th}$ channel retry counter ($k_n$=0). In step 602, interrupt channel (line) n is checked to see if an IRQ exists and, if so, step 602 moves the process to test step 604, otherwise, n is incremented modulo-p in step 624 and the process returns to step 602. Step 606 checks to see if Retry Timer Unit has the channel n flag set and, if so, causes the interrupt request message for channel n to be broadcast on Interrupt Bus 115 (step 608). Otherwise, the process proceeds to step 624. Step 610 increments the n channel retry counter indicating the number of times the $n^{th}$ channel interrupt has been broadcast. Step 612 checks if the interrupt request has been accepted, and, if so, proceeds to step 618 where $k_n$ is cleared and the $n^{th}$ exponential clock in Retry Timer 210 is reset. Otherwise, retry counter, $k_n$, is checked to determine if the maximum allowable IAU clock intervals, $K_m$, has been exceeded, and, if so, a system interrupt flag is set indicating that an interrupt service request has not been serviced in the prescribed time and proceeds to step 618 for resetting of parameters. If $k_n <_{Km}$, step 620 tests if this is a new retry candidate ($k_n$=1) and, if so, starts the nth exponential clock in Retry Timer 210. Otherwise, the process goes to step 624. Steps 622 and 618 also proceed to step 624 where the channel index, n, is incremented modulo-p and p is the number of I/O interrupt lines (p=16 for an IDU and p=1 for an IAU).

In order for a signal on edge-sensitive Interrupt Input Lines 119 to be recognized as a valid edge (and not a glitch), the input level on the pin must remain asserted until IDU 113 broadcasts the corresponding message over the Interrupt Bus and the message has been accepted by the destination(s) specified in the destination field. Only then will the source IDU be able to recognize a new edge on that interrupt input pin. That new edge will only result in a new invocation of the handler if its acceptance by the destination IAU causes an Interrupt Request Register (IRR) bit to go from zero to 1. (In other words, if the interrupt wasn't already pending at the destination.)

The minimum number of entries in the Redirection Table in the IDU implementation should be 16. The I/O Version Register contains the number of entries in that IDU's redirection table. The layout of an entry in the Redirection Table 201 is as shown in FIG. 8.

Each redirection table entry is a 64-bit string defined as follows:

VECTOR[0:7]: The Vector field is an 8-bit field containing the interrupt vector for this interrupt. Vector values range between 10 and FE (hex).

DELIVERY MODE[8:10]: The Delivery Mode is a 3-bit field that specifies how the IAUs listed in the destination field should act upon reception of this signal. Note that certain Delivery Modes will only operate as intended when used in conjunction with a specific Trigger Mode. These restrictions are indicated in the table below for each Delivery Mode.

000 (Fixed): means deliver the signal to the INTR (maskable interrupt) input of all processor cores listed in the destination. Trigger Mode for "fixed" Delivery Mode can be edge or level.

001 (Lowest Priority): means deliver the signal to the INTR input of the processor core that is executing at the lowest priority among all the processors listed in the specified destination. Trigger Mode for "lowest priority" Delivery Mode can be edge or level.

010 (SMI): means System Management Interrupt. A delivery mode equal to "SMI" requires an "edge" Trigger Mode. The Vector information is ignored but should be programmed to all zeroes.

100 (NMI): means deliver the signal to the NMI (non-maskable interrupt) input of all processor cores listed in the destination, vector information is ignored. "NMI" is treated as an "edge" triggered interrupt even if it is programmed as a "level" triggered interrupt.

101 (INIT): means deliver the signal to all processor cores listed in the destination by asserting the INIT signal. All addressed IAUs will assume their INIT state. INIT is always treated as an "edge" triggered interrupt even if programmed otherwise.

111 (ExtINT): means deliver the signal to the INTR input of all processor cores listed in the destination as an interrupt that originated in an externally connected (Intel 8259A-compatible)interrupt controller. The Interrupt Acknowledgment (INTA) cycle that corresponds to this ExtINT delivery will be routed to the external controller that is expected to supply the vector. A Delivery Mode of "ExtINT" requires an "edge" Trigger Mode.

DESTINATION MODE[11]: This field determines the interpretation of the Destination field as follows:

0 (Physical Mode): in Physical Mode, a destination IAU is identified by its

ID. Bits 56–59 of the Destination field specify the 4-bit IAU.

1 (Logical Mode): in Logical Mode, destinations are identified by matching on Logical Destination under the control of the Destination Format Register and Logical Destination Register in each IAU. Bits 56–63 (8 MSB) of the Destination field specify the 8-bit IAU ID.

DELIVERY STATUS[12]: Delivery Status is a 1-bit field that contains the current status of the delivery of this interrupt. Two states are defined:

0 (Idle): means that there is currently no activity for this interrupt; and 1 (Send Pending): indicates that the interrupt has been injected, but its delivery is temporarily held up due to the Interrupt Bus being busy, or the inability of the receiving IAU to accept that interrupt at that time. Delivery Status is software read-only; software writes to this field (as part of a 32-bit word) do not affect this bit.

INTERRUPT INPUT PIN POLARITY[13]: This bit specifies the polarity of each interrupt signal connected to the interrupt pins of the IDU. A value of zero means the signal is high, and a value of 1 means the signal is low active.

REMOTE IRR[14]: This bit is used for level-triggered interrupts; its meaning is undefined for edge-triggered interrupts. For level-triggered interrupts, this bit is set when IAUs accept the level interrupt sent by the IDU. Remote IRR bit is reset when an interrupt input line level is inactive or an End-of-Interrupt (EOI) message is received from an IAU.

TRIGGER MODE[15]: The Trigger Mode field indicates the type of signal on the interrupt pin that triggers an interrupt. Zero indicates edge-sensitive, and 1 indicates level-sensitive.

MASK[16]: Use this bit to mask injection of this interrupt. Zero indicates that injection of this interrupt is not masked. An edge or level on an interrupt pin that is not masked results in the delivery of the interrupt to the destination. One (1) indicates that injection of this interrupt is masked. Edge-sensitive interrupts signaled on a masked interrupt input pin are simply ignored (i.e., it is not delivered and is not held pending). Level-asserts or deasserts occurring on a masked level-sensitive pin are also ignored and have no side effects. Changing the mask bit from unmasked to masked after the interrupt was accepted by an IAU has no effect on that interrupt. This behavior will be identical to the case in which the interrupting device withdraws the interrupt before that interrupt is posted to the processor. It is the software's responsibility to deal with the case where the Mask bit is set after the interrupt message has been accepted by an IAU but before the interrupt is dispensed to the processor.

BUFFER FLUSH ENABLE[17]: This bit controls the flushing of I/O Registers on a per-interrupt basis. When this bit is set to zero, the I/O Register must be flushed before the I/O interrupt is sent to the IAUs. When this bit is set to one, the flushing of I/O Register is not required before sending the I/O interrupt to the IAUs.

DESTINATION[56:63]: If the Destination Mode of this entry is "Physical Mode", then bits 56–59 contain an IAU ID. If Logical Mode, then the Destination field potentially defines a set of processors. Bits 56–63 of the Destination field specify the logical destination address.

D. IAU Structure

Figure 9:
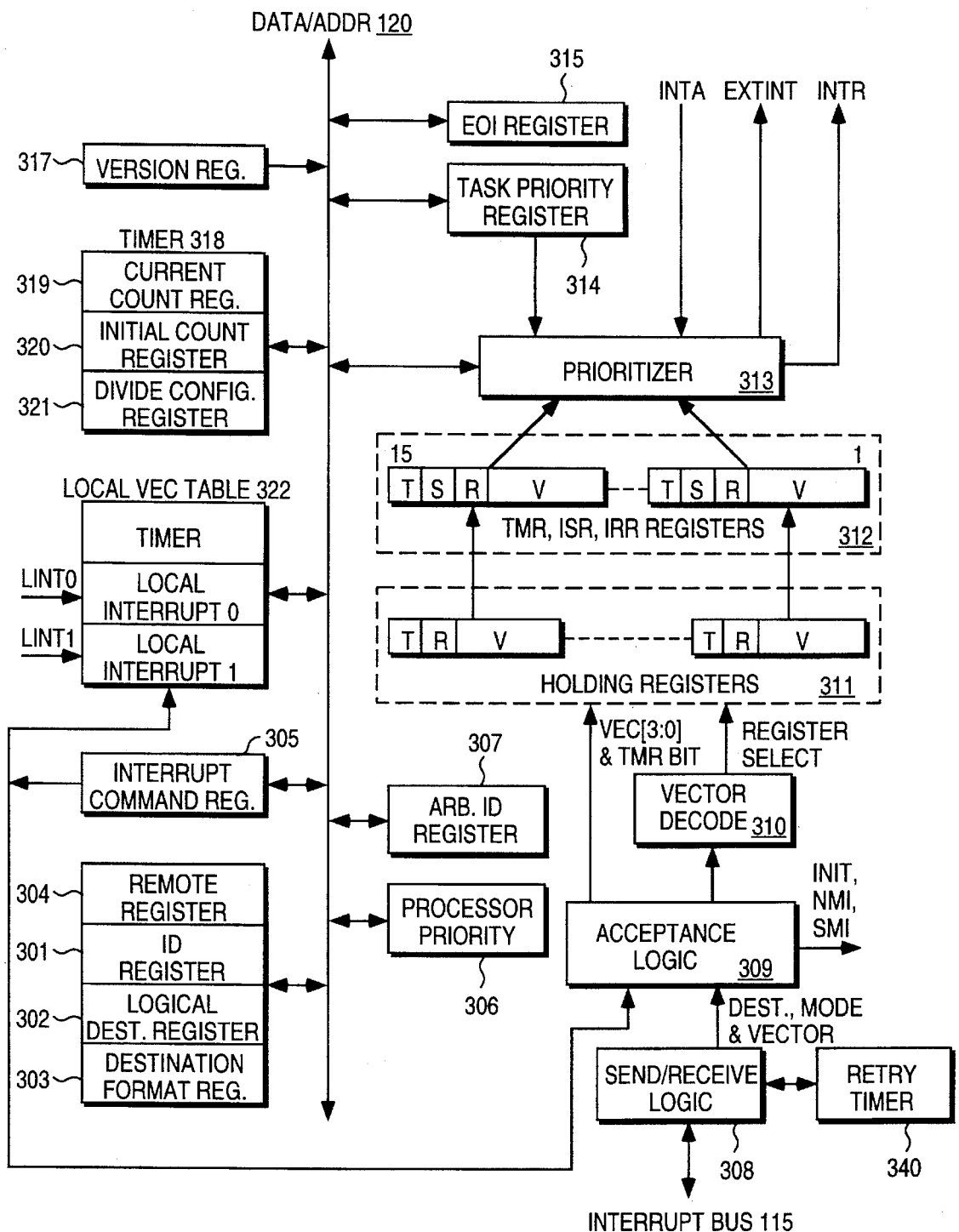
FIG. 9 shows the architecture of an Interrupt Acceptance Unit (IAU).

The IAU is responsible for the local processor interrupt sources, interrupt acceptance, dispensing interrupts to the processor, and sending interprocessor interrupts. Depending on the Delivery Mode of the interrupt, none, some, or all IAUs can accept an interrupt. An IAU accepts an interrupt only if it will deliver the interrupt to its processor. Accepting an interrupt is purely an inter-MPIC matter; dispensing an interrupt to the local processor only involves an IAU and its associated processor. FIG. 9 is a block diagram of an IAU.

Software interacts with the IAU by reading and writing its registers. The intent is that the register set of each IAU appear at an identical address for each processor. Software can then use an identical address to control interrupts independently of which processor, in the multiprocessor system, is currently running the code.

The address space (memory space) for the IAU is fixed at FEE0 0000 (hex) for 32-bit address and reserves 4k bytes of memory. Typically, software would access IDUs very infrequently, while access to the IAUs is performance-critical. Locating the local unit in memory space yields best performance since software writes to the IAU registers can be posted at the processor. Note that write posting works as long as the INTA (interrupt acknowledge) cycle forces a flush of all buffered writes by the processor doing the INTA.

All registers are accessed by unique addresses and by using 32-bit loads and stores. This implies that, to modify a field (e.g., bit, byte) in any register, the whole 2-bit register must be read, the field modified, and the 32 bits written back. Also, registers that are described as 64 or 256 bits wide are accessed as multiple independent 32-bit registers.

Register description fields containing r's or <RESERVED> or <reserved> are reserved by the architecture. Reserved fields will read as all zeroes.

The destination of an interrupt can be zero, one, all, or a group of processors in the system. A different destination can be specified for each interrupt. The sender specifies destination of an interrupt in one of two Destination Modes: Physical Mode and Logical Mode.

In Physical Mode, the destination processor is specified by a unique 4-bit ID. Only a single destination or a broadcast to all (ID of all ones) can be specified in this mode.

Each IDU and IAU has a register that contains the unit's ID. The ID serves as a physical name of the MPIC unit. The ID is loaded at power-up. It can be read by software at all times without any side effects.

Figure 10:
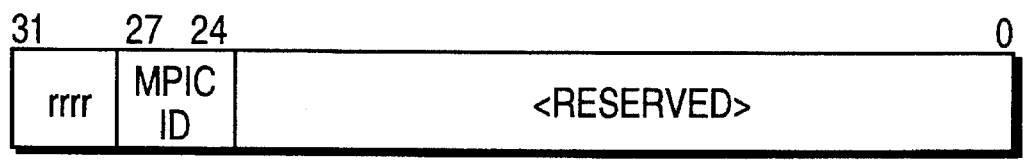
FIG. 10 shows the IAU ID Register bit assignment.

In the Physical Mode, the ID is used to specify destination information. In the preferred embodiment, a maximum of 15 IAUs are supported. An ID of all 1s denotes a broadcast to all IAUs. FIG. 10 shows the bit assignments of the IAU ID register 301.

Figure 11:
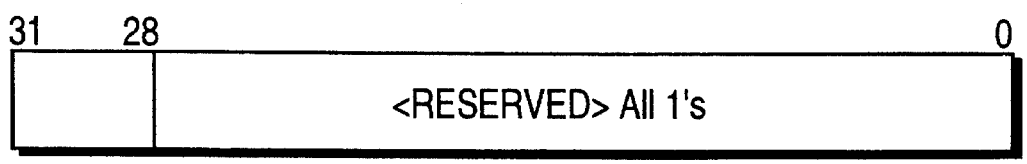
FIG. 11 shows the IAU Destination Format Register bit assignment.
Figure 12:
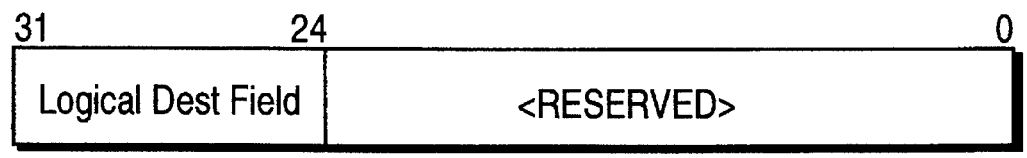
FIG. 12 shows the IAU Local Destination Register bit assignment.

In the Logical Mode, destinations are specified using an 8-bit Logical Destination Field. All IAUs contain an 8-bit field in Logical Destination Register (LDR) 302 against which the Destination Field of interrupt is matched to determine if the receiver is being targeted by the interrupt. An additional 8-bit Destination Format Register (DFR) 302 in each IAU defines exactly how the Destination Field is compared against the LDR. In other words, DFR 302 defines the interpretation of the Logical Mode destination information. The 4 bits (bits 24 to 27) of the Destination Format Register is always fixed with 1s. FIGS. 11 and 12 show the bits assignment for DFR 302 and LDR 303.

DFR 302 and LDR 303 can be programmed to achieve a Flat Model interrupt delivery mode of the cluster-based delivery mode.

For the Flat Model, bits 28–31 of the DFR 302 must be programmed to 1s. Bits 0–27 of the DFR are always 1s.

Also, bits 24–31 of the destination information are interpreted as a decoded field. This field is compared against the LDR of the IAU. If there is a bit match (i.e., if at least one of the corresponding pair of bits of the Destination Field and LDR match), this IAU is selected for interrupt deliver. Each bit position in the Destination Field corresponds to an individual IAU. this scheme allows the specification of arbitrary groups of IAUs simply by setting the member's bits to one, but only allows a maximum of eight IAUs in a system.

Broadcast to all is achieved by setting all 8 bits of destination to 1s. This selects all IAUs in the MPIC system.

For the Cluster Model, bits 28–31 of the FDR should be programmed to zeroes. In this model, there are two connection schemes: Flat Cluster and Hierarchical Cluster.

In the Flat Cluster Model, all clusters are connected on a single Interrupt Bus. Bits 28–31 of the Destination Field are the encoded address of the destination cluster which is compared against bits 28–31 of the LDR to determine if the IAU is part of the cluster. The lower four bits of the Destination Field and bits 24–27 of the LDR are compared to identify individual IAUs within the cluster. Arbitrary sets of processors within a cluster can be specified by naming the cluster and setting the bits in the LDR destination field (bits 24–27) for the selected members in the cluster. In this mode, 15 clusters each having four processors can be supported. But the arbitration ID supports only 15 agents on the Interrupt Bus, and hence the total number of processors supported in this mode is limited by the MPIC ID. Broadcast to all is achieved by setting all destination bits to 1. This guarantees a match on all clusters, and will select all IAUs in each cluster.

In the hierarchical Cluster Model, fiat clusters are connected through hierarchical Interrupt Buses. Cluster managers handle the message passing between Interrupt Buses.

Each processor has a processor priority that reflects the relative importance of the code the processor is currently executing. This code can be part of a process or thread, or can be an interrupt handler. A processor's priority fluctuates as a processor switches threads, a thread or handler raises and lowers its priority level to mask out interrupt handlers, and the processor enters an interrupt handler and returns from an interrupt handler to a previously interrupted activity.

A processor is lowest priority within a given group of processors if its processor priority is the lowest of all processors in the group. Note that more than one processor can be lowest priority in a given group.

A processor is the focus of an interrupt if it is currently servicing that interrupt, or if it currently has a request pending for the interrupt. Focus processor checking can be enabled/disabled by programming the bit 9 of the Spurious Interrupt Vector Register.

Interrupt delivery begins with an interrupt source injecting its interrupt into the interrupt system at one of the IDUs. Delivery is complete only when the servicing processor tells its local IAU it is complete by issuing an end-of-interrupt (EOI) command to its local IAU. Only then has all relevant information regarding that occurrence of the interrupt been erased. The interrupt system guarantees exactly-once acceptance semantics of interrupts to the specified destinations.

Clearly, a single-edge interrupt or level interrupt counts as a single occurrence of an interrupt. In uniprocessor systems, an occurrence of an interrupt that is already pending cannot be distinguished from the previous occurrence. All occurrences are recorded in the same interrupt IRR bit. They are therefore treated as "the same" interrupt occurrence.

For lowest-priority delivery mode, the identical behavior can be achieved in a multiprocessor system by delivering an interrupt first to its focus processor (if it currently has one). If an interrupt has a focus processor, then the interrupt will be delivered to the interrupt's focus processor independent of priority information.

Each edge occurring on an edge-triggered interrupt input pin is clearly a one-shot event; each occurrence of an edge is delivered. An active level on a level-triggered interrupt input pin represents more of a "continuous event ". Repeatedly, broadcasting an interrupt message while the level is active would cause flooding of the Interrupt Bus and, in effect, transmits very little useful information since the same processor (the focus) would have to be the target.

Instead, for level-triggered interrupts, the IAUs recreate the state of the interrupt input pin at the destination IAU. The source IDU accomplishes this by tracking the state of the appropriate destination IAUs Interrupt Request Register (or pending bit) in register group 312. The destination IAU sends an inter-MPIC message to all IDUs to reset the remote IRR bit when the EOI for that level interrupt is serviced by the destination IAU. Then, the relevant IDU resets the remote Interrupt Request Register (IRR) bit of that level interrupt.

Because IAUs have storage in the IRR for pending only two interrupts per class, there is a possibility that the IAU cannot accept further interrupts in that same class. In this case, the IAU notifies the sender by means of the status cycle of the message to "retry" the same interrupt again later.

Interprocessor interrupt (IPI) messages also use the Interrupt Bus and therefore IAUs are required to follow the same rules for message retrys as the IDUs. This is accomplished by providing a Retry Timer 340 coupled to the IAU Send/Receive Logic Unit 308 as shown in FIG. 9. Retry Timer is a single channel unit used to retry the IPI message contained in Interrupt Command Register 305.

Remote Read messages are always accepted unless there is a check sum error. There is no retry for Remote Read message. NMI, SMI, INIT, and ExtINT interrupts are retried for check sum and acceptance errors. These interrupts are always accepted by the IAUs if there is no check sum or acceptance errors.

The MPIC supports two modes for selecting the destination processor: Fixed Priority and Lowest Priority. Fixed Priority is a static distribution mode, while Lowest Priority is a dynamic mode.

In fixed redirection mode, the interrupt is unconditionally delivered to all IAUs that match on the destination information supplied with the interrupt. Note that for I/O device interrupts, typically only a single IAU would be listed in the destination. Priority and focus information are ignored. If the priority of a destination processor is higher than or equal to the priority of the interrupt, then the interrupt is held pending locally in the destination processor 's local IAU. When the processor priority becomes low enough, the pending interrupt is dispensed to the processor by its local IAU.

Fixed redirection allows static distribution of the interrupt load across all processors. It also allows existing single-threaded device drivers to function in a multiprocessor system environment. It requires that software bind the driver to a fixed processor and set up the IDU to direct the device's interrupts to only that processor.

Under the Lowest Priority delivery method, the processor that will handle the interrupt is the one in the specified destination with the lowest processor priority value. If more than one processor is at the lowest priority, then the unique arbitration ID is used to break ties. For lowest priority dynamic delivery, the interrupt will always be taken by its focus processor if it has one. Only IAUs which have a free or available holding register for the priority class will participate in the lowest priority arbitration.

The Lowest Priority delivery method assures minimum interruption of high priority tasks. Because each IAU only knows its own associated processor priority, determining the lowest priority processor is done by arbitration on the Interrupt Bus.

All DUs and IAUs communicate during interrupt delivery. Interrupt information is exchanged between different MPIC units on a dedicated three-wire Interrupt Bus in the form of broadcast messages. The format of these MPIC messages is not visible to software.

The 4-bit arbitration ID (Arb ID Register 307) is derived from the contents of ID Register 301. MPIC employs rotating priority scheme for bus arbitration. The Arb Ds are updated every time a message is transmitted successfully.

Each IAU using a common Interrupt Bus should have a unique ID. The Arbitration ID is also used to resolve ties during lowest priority arbitration.

The Redirection Table of IDU 113 (FIG. 3) serves to steer interrupts that originate in the I/O subsystems to the processors. Local Vector Table 332 of FIG. 9 is its equivalent for interrupts that are restricted to the local processor. The Local Vector Table 332 contains four 32-bit entries: Timer, Local Interrupt 0, Local Interrupt 1, and Error Interrupt, as shown in FIG. 13.

Figure 13:
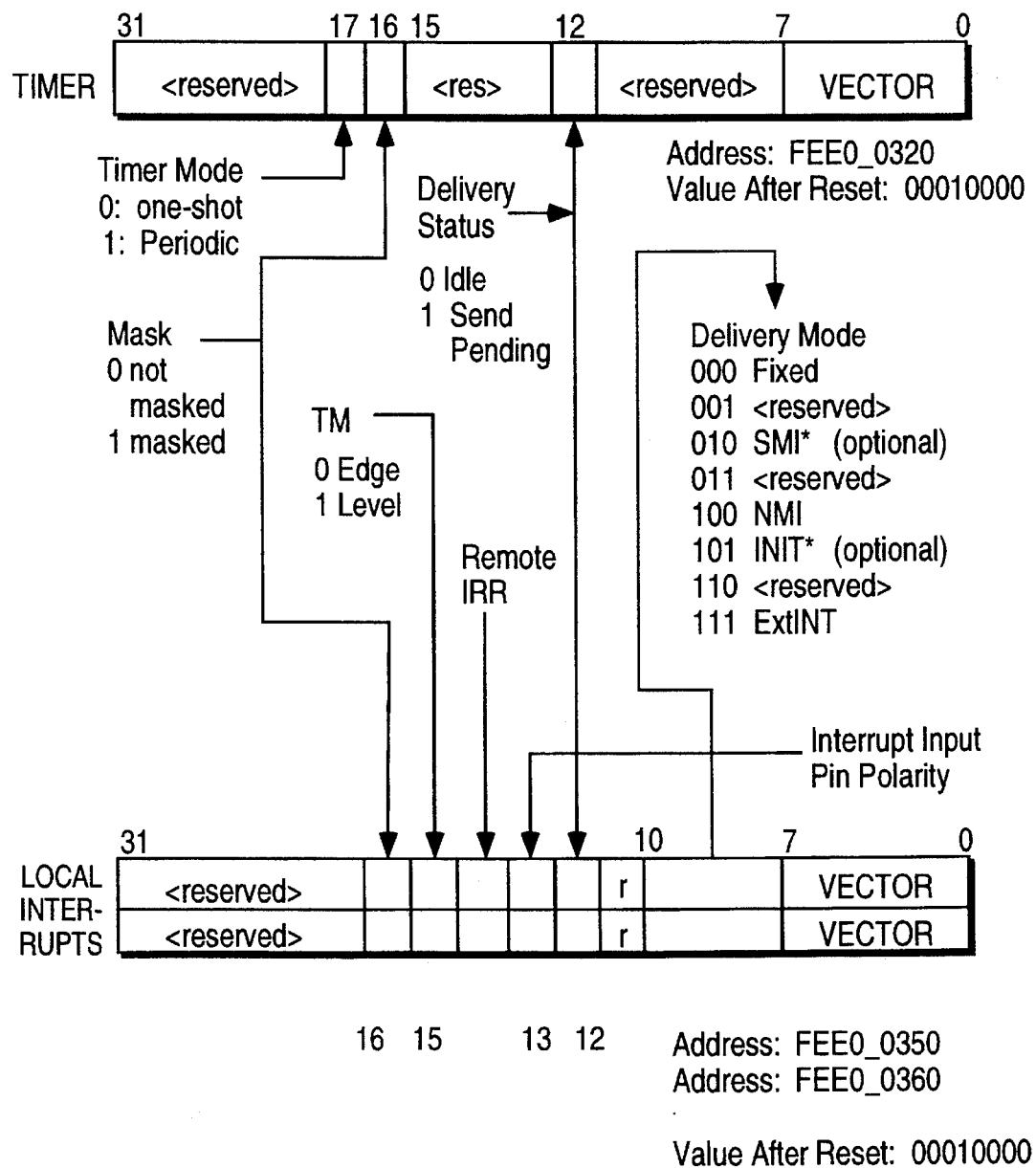
FIG. 13 shows the IAU Logical Vector Table bit assignment layout.

The assigned bit fields of FIG. 13 are as follows:

VECTOR[0:7]: This is the vector bit field to use when generating an interrupt for this entry. The vector values range between 10 and FF(hex).

DELIVERY MODE[7:10]: This field only exists for the Local Interrupt entries 1 and 2, and has the same meaning as the Delivery Mode in Redirection Table 201 of the IDU shown in FIG. 3. The Timer entry generates edge-triggered maskable interrupts to the local processor. Delivery Mode field does not exists for Timer interrupt entry.

DELIVERY STATUS[12]: Delivery Status in Local Vector Table entries is identical to Delivery Status in the Redirection Table 201 (Idle, Send Pending). This field is software read-only.

INTERRUPT INPUT PIN POLARITY[13]: This bit specifies the polarity of each interrupt signal connected to the interrupt pins of the IAU. A value of zero means the signal is high active, and a value of 1 means the signal is low active.

REMOTE IRR[14]: This bit is used for level-triggered interrupts; its meaning is undefined for edge-triggered interrupts. For level-triggered interrupts, this bit is set when the acceptance logic of the IAU accepts the interrupt. Remote IRR bit is reset when the corresponding line level of Interrupt Input lines 119 of the IDU is inactive or an EOI message is received from the IAU.

TRIGGER MODE[15]: The Trigger Mode field indicates the type of signal on the local interrupt pin that triggers an interrupt: zero indicates edge-sensitive; 1 indicates level-sensitive. Only the local interrupt pins can be programmed as edge- or level-triggered. Timer interrupt is always treated as edge triggered.

MASK[16]: Zero enables injection of the interrupt; 1 masks injection of the interrupt.

TIMER MODE[171]: Zero indicates one-shot mode; one indicates periodic mode. (This field is only defined for the Timer entry.)

A processor generates interprocessor interrupts (IPIs) by writing to Interrupt Command Register (ICR) 305 in its local IA U. Conceptually, this can be thought of as the processor providing an interrupt Redirection Table Entry on the fly. Not surprisingly, the layout of Interrupt Command Register 305 resembles that of an entry in Redirection Table 201 of FIG. 3. Note that the format of this register allows a processor to generate an edge-triggered interrupt. A processor may use this to forward device interrupts originally accepted by it to other processors. This can also be a useful debug feature. All interprocessor interrupts are treated as edge triggered even if programmed otherwise.

All fields of ICR 305 are read-write by software with the exception of the Delivery Status and Remote Read Status fields which are read-only. Writing a 32-bit word to an ICR that contains an interrupt vector causes the interrupt message to be sent.

Figure 14:
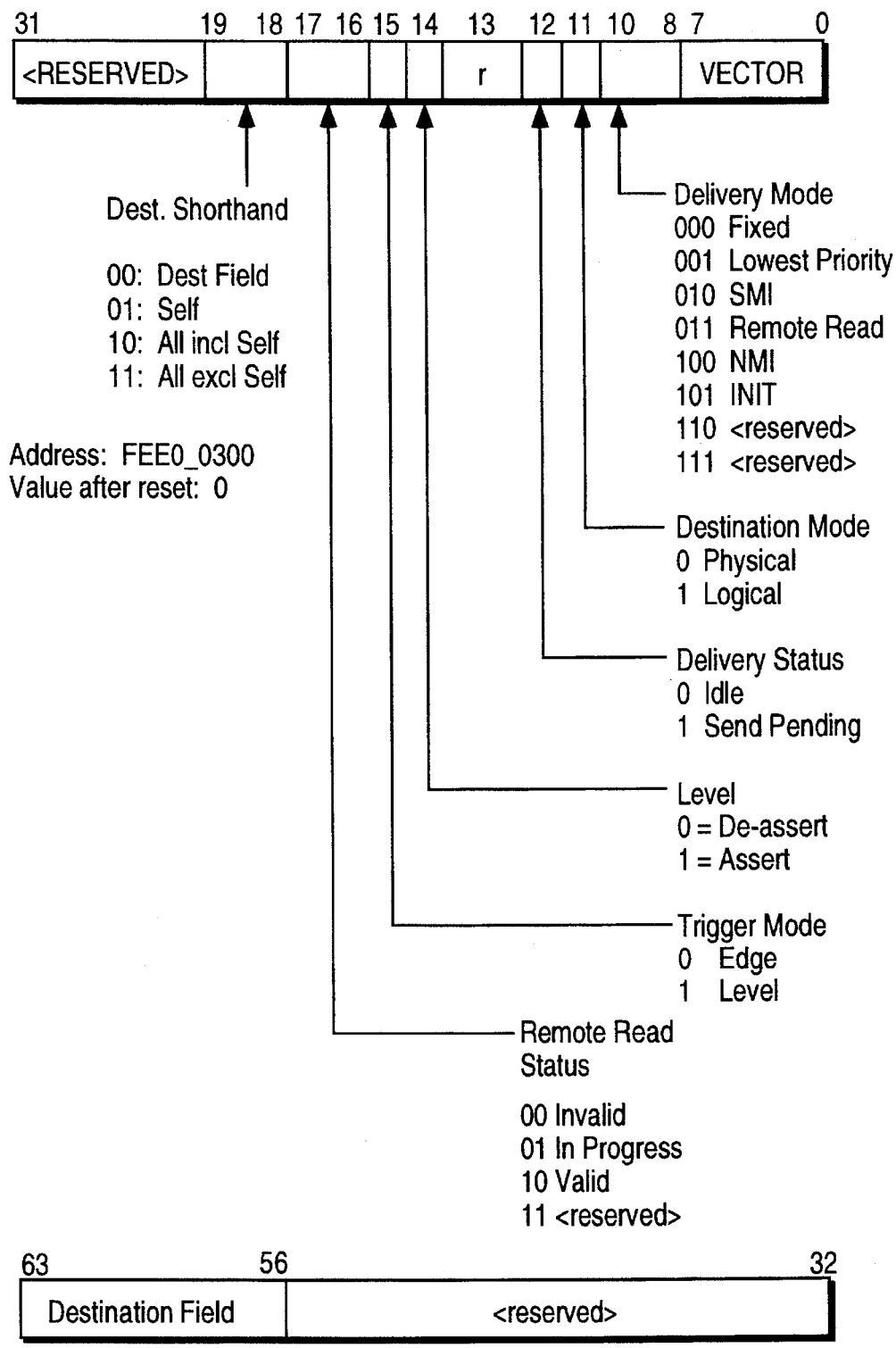
FIG. 14 shows the IAU Interrupt Command Register bit assignment layout.

The bit assignments for ICR 305 are shown in FIG. 14 and are described as follows:

VECTOR[0:7]: The vector ID identifying the interrupt being sent. If the Delivery Mode is "Remote Read", then the Vector field contains the address of the register to be read in the remote IAU. DELIVERY MODE[8:10]: The Delivery Mode is a 3-bit field that specifies how the IAUs listed in the destination field should act upon reception of this signal. Note that all interprocessor interrupts behave as edge-triggered interrupts (except for a special case of INIT described later) even if they are programmed as level-triggered interrupts.

000 (Fixed): means deliver the signal on the INTR signal of all processor cores listed in the destination. Always edge-triggered. Trigger Mode and level information are don't care.

001 (Lowest Priority): means deliver the signal on the INTR signal of the processor core that is executing at the lowest priority among all the processors listed in the specified destination. Always edge-triggered. Trigger Mode and level information are don't care.

010 (SMI): means System Management Interrupt. A delivery mode equal to "SMI" is treated as an "edge" triggered interrupt. The vector information is ignored. Trigger Mode and level information are don't care.

011 (Remote Read): is a request to a remote IAU to send the value of one of its registers over the Interrupt Bus. The register is selected by providing its address in the Vector field. The register value is latched by the sending IAU and stored in the Remote Register where it can be read by the local processor. A Delivery Mode of "Remote Read" requires an edge Trigger Mode.

100 (NMI): means deliver the signal to the NMI input of all processor cores listed in the destination, vector information is ignored. "NMI" is treated as an "edge" triggered interrupt even if it is programmed as a "level" triggered interrupt. Trigger Mode and level information are don't care.

101 (INIT): means deliver the signal to all processor cores listed in the destination by asserting the INIT signal. All addressed IAUs will assume their INIT state. INIT is always treated as an "edge" triggered interrupt even if programmed otherwise except for the following special case. When INIT is programmed with Trigger Mode="level" and Level Mode=0 (i.e., deassert), it will be interpreted as a synchronization message to all MPIC agents to synchronize their Arb IDs with their MPIC IDs. Hereafter, this message is referred to as "INIT Deassert". When INIT is programmed as an "edge" triggered interrupt, "Level" information is don't care.

DESTINATION MODE[11]: The interpretation of this field is identical to the Destination Mode field in Redirection Table 201.

DELIVERY STATUS[12]: A value of zero means there is no activity for this interrupt. A value of 1 means delivery of this interrupt is temporarily held up due to the Interrupt Bus being busy or the receiving IAU not having a free interrupt slot to accept the interrupt. If the message encounters a Checksum (CS) error or a no response error, the IAU will set the appropriate error bit in the error status register and will retry the message. Software determines the number of retry allowed before treating it as a hard error.

LEVEL[14]: This bit is used for the Special case of INIT delivery mode described above. For all other delivery modes, this bit is a don't care.

TRIGGER MODE[15]: This field is used for the Special case of INIT delivery mode described above. For all other delivery modes, this bit is a don't care.

REMOTE READ STATUS[16:17]: This field indicates the status of the data contained in the Remote Read register. This field is read-only to software. Whenever software writes to the Interrupt Command Register 305 using Delivery Mode "Remote Read", the Remote Read status becomes "in-progress" (waiting for the remote data to arrive). The remote MPIC agent is expected to respond in a fixed amount of Interrupt Bus cycles. If the remote agent is unable to do so, then the Remote Read status becomes "Invalid". If successful, the Remote Read status resolves to "Valid". Software should poll this field to determine completion and success of the Remote Read command. This 2-bit code has the following interpretation:

- 00 (invalid): the content of the Remote Read Register is invalid. This is the case after a Remote Read command issued and the remote agent was unable to deliver the Register content in time or the message had a check sum error.
- 01 (in progress): a Remote Read command has been issued, and this IAU is waiting for the data to arrive from the remote agent.
- 10 (valid): the most recent Remote Read command has completed, and the remote register content in the Remote Read Register is valid.

DESTINATION SHORTHAND[18:19]: This field indicates whether a shorthand notation is used to specify the destination of the interrupt by the shorthand code used. Destination Shorthands do not use the 8-bit Destination field and can be sent by software with a single 32-bit write to the IAU Interrupt Command Register 305. The 2-bit code is interpreted as follows:

- 00 (dest-field): means that no shorthand is used. The destination is specified in the 32-bit Destination field in the second word (bits 32–63) of the Interrupt Command Register 305.
- 01 (self): means that the same IAU is the sole destination of the interrupt. This is useful for software interrupts. The Destination field in the Interrupt Command Register is ignored. In this mode, Lowest Priority and Remote Read delivery modes are not supported.
- 10 (all-incl-self): means that the interrupt is to be sent to "all" processors in the system including the processor sending the interrupt. The sending IAU broadcasts a message with destination field set to all ones. Global TLB (cache table look-aside buffer) flush and broadcasting timer interrupts are typical uses for this mode. In this mode, Lowest Priority and Remote Read delivery modes are not supported.
- 11 (all-excl-self): means that the interrupt is to be sent to "all" processors in the system with the exception of the processor sending the interrupt. The IAU broadcasts a message with the Physical Destination Mode field and ID field set to all 1s. All-excl-self is useful for selection of a boot processor (init) and also for TLB flush where "self" is flushed using the processor flush instruction.

DESTINATION[56:63]: This field is only used when the Destination Shorthand is set to "dest-field". If Destination Mode is Physical Mode, then the bits 56–59 contain an IAU ID. If Logical Mode, then the interpretation of the 8-bit Destination field further depends on the Destination Format Register 303 and LDR in the IAUs.

All IAUs receive all messages broadcast over the Interrupt Bus. The IAU first checks if it is the message destination by matching the 8-bit Destination field in the message against its ID register (in the physical address mode) or LDR 302 under control of its Destination Format Register, in the logical address mode. All IAUs that match are said to "belong to the group".

Once an IAU determines it is a destination, it checks the availability of a slot in the Interrupt Request Register (IRR) for that particular interrupt (except for NMI, SMI, INIT, ExtINT). In the fixed delivery mode, if a slot is not available, the IAU will put "retry" status on the bus during the status cycle. If it can accept the interrupt, it waits until the status cycle to see any other agent has put "reject" or "retry" status on the bus. If there is no reject or retry status on the bus, the IAU accepts the interrupt.

In the lowest priority delivery mode, only IAUs which have interrupt slots available will participate in the lowest priority arbitration.

If a message is to be delivered for NMI, INIT, SMI, or ExtINT, then all IAUs listed in the destination unconditionally assert the corresponding output signal to the associated processor. ISR, IRR, etc. are bypassed for these types of interrupts, and vector information is not defined except for SMI. For SMI, vector field must be programmed to zero for future compatibility.

Because IAUs can accept interrupts from their local ICR and Interrupt Bus, there will be contention between these interrupts for the IAUs acceptance resources. In case of contention, the Interrupt Bus has the highest priority followed by the ICR and local interrupts.

Figure 15:
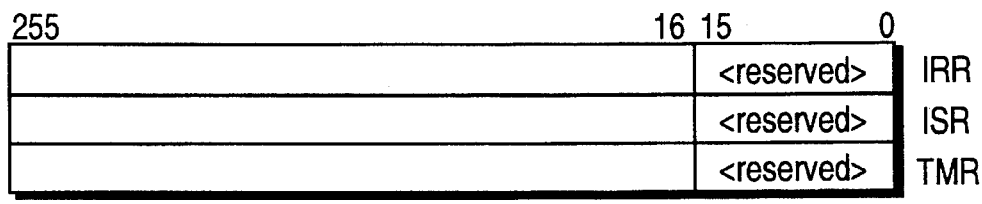
FIG. 15 shows the IRR, ISR, and TMR bit assignment.

Each IAU contains IRR, ISR, and TMR registers in register group 312 of FIG. 9, and formatted as shown in FIG. 15, that play a role in the acceptance of interrupts and in dispensing the accepted interrupts to the local processor. The Interrupt Request Register (IRR) contains the interrupts accepted by the IAU (up to two deep) but not yet dispensed to the associated processor. The In Service Register (ISR) contains the interrupts that are currently in service by the processor, i.e., the interrupts that have been dispensed to the processor but for which the processor has not yet signaled the End-of-Interrupt (EOI).

Each interrupt has an associated vector that determines the priority of the interrupt. When an interrupt is being serviced, all equal or lower priority interrupts are automatically masked by the IAU.

The Trigger Mode Register (TMR) indicates whether an interrupt is edge or level. This information is transmitted with each MPIC interrupt request message and reflects the Trigger Mode bit in the interrupt's Redirection Table 201 entry. The IRR bit is cleared at the same time ISR bit is set during the INTA cycle. If the TMR bit value is 1, then the local IAU will send a reassert message to all IDUs when the EOI cycle for that interrupt occurs.

ISR, IRR, and TMR registers are read-only by software. Each of these 256-bit registers is accessed as eight separate 32-bit registers. The processor masks interrupts by writing to the local IAU's Task Priority Register (described below).

Each of these registers (IRR, ISR, TMR) is seen by software as a bit array of 256 bits where bit "i" tracks the interrupt with vector "i". These registers are software only and bits 0–15 are reserved.

TMR (Trigger Mode Register): Upon acceptance of an interrupt, the TMR bit is cleared (zero) for edge-triggered interrupts and set (1) for level triggered interrupts. If TMR bit value is zero, nothing happens. IF TMR bit value is 1, then the local IAU sends an EOI message to all IDUs during the EOI cycle of that interrupt.

IRR (Interrupt Request Register): It contains the active interrupt requests that have been accepted, but not yet dispensed by this IAU. A bit in IRR is set when the IAU accepts the interrupt and is cleared when the INTA cycle occurs.

ISR (In Service Register): It marks the interrupts that have been delivered to the processor, but that have not been fully serviced (End-of-Interrupt not yet received). The ISR register reflects the current state of the processor's interrupt stack. ISR bit for the highest priority IRR is set during the INTA cycle. During the EOI cycle, the highest priority ISR bit is cleared and, if the corresponding TMR bit was set, an EOI message will be sent to all IDUs.

In addition to the IRR, ISR, and TMR registers, there are Holding Registers 311 for each priority level. These registers are used to temporarily store the interrupt and trigger level information before it is passed onto IRR and TMR registers, respectively. The registers are software transparent.

Figure 16:
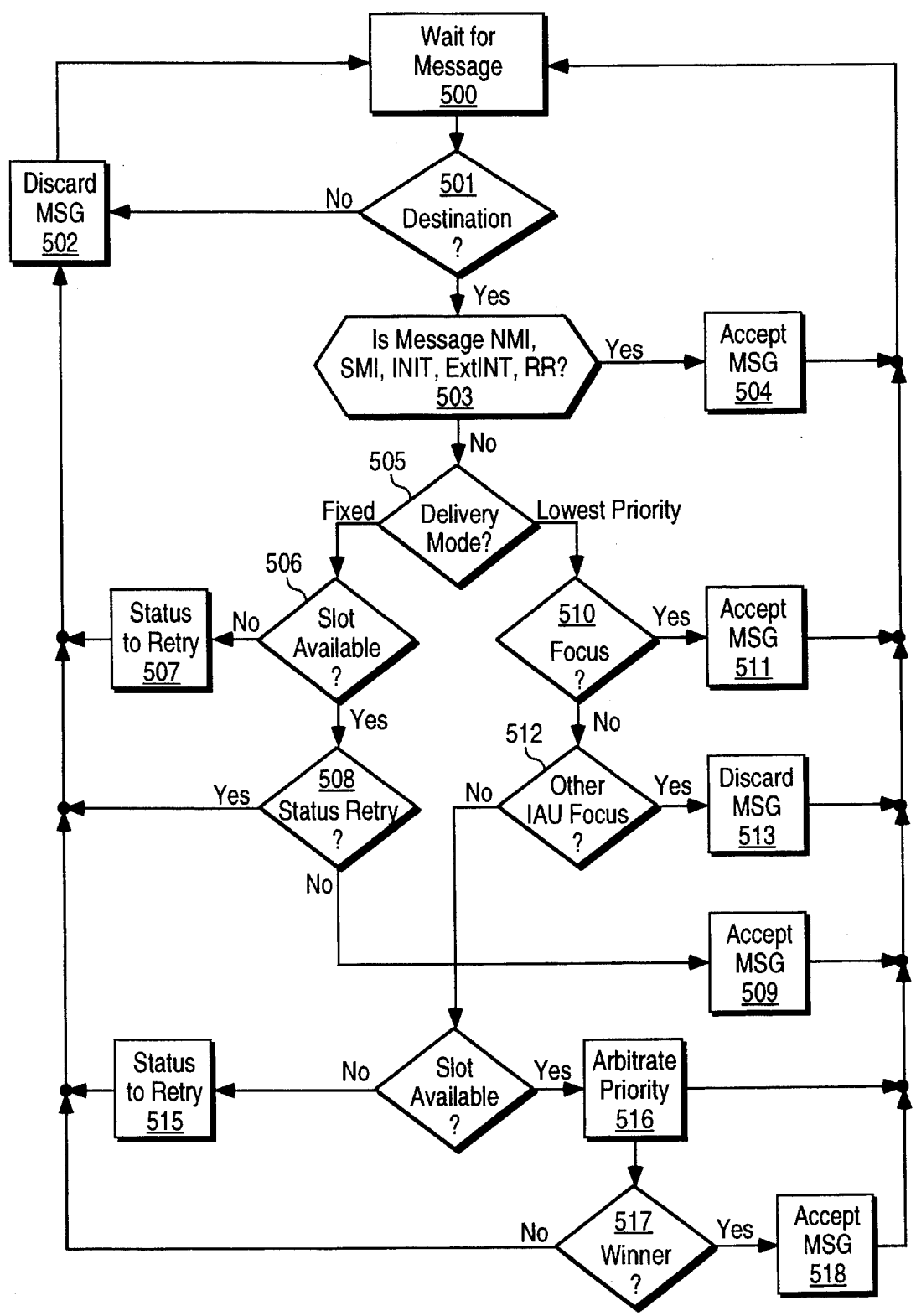
FIG. 16 is a flow diagram of the IAU interrupt acceptance process.

FIG. 16 is a flow diagram of the interrupt acceptance process of the IAU. The process begins at step 500 in which the IAU is awaiting an interrupt request message (IRQ) from the Interrupt Bus. Upon receipt of the IRQ, the IAU checks to see if it is designated as a destination in step 501, and if not, the IAU discards the message and returns to step 500. If the IAU is a designated destination, step 503 checks if the IRQ is a an NMI, SMI, INIT, ExtINT or an RR (remote-real) type of interrupt and, if so, accepts the message in step 504 and returns to step 500. If not, the process proceeds to step 505 where the delivery mode is checked. If it is fixed mode delivery, step 506 checks to see if an interrupt slot is available and, if not, sets the status bit to retry in step 507, discards the message in step 502 and returns to step 500. If an interrupt slot is available, step 508 checks if the status is a retry and, if so, discards the message in step 502 and then returns to step 500. If it is not a retry, the IAU accepts the message in step 509 and returns to step 500. If the delivery mode in step 505 is lowest priority, step 510 checks if the IAU is a focus and, if so, accepts the message in step 513. Otherwise, the process moves to step 512 where it checks if another IAU is a focus and, if so, discards the message in step 513 and proceeds back to step 500. If no focus exists, step 514 checks if an interrupt slot is available and, if not, sets the status to retry and returns to step 500 after discarding the message in step 502. Otherwise, if an interrupt slot is available, arbitration is invoked in step 516 and, if the IAU wins the arbitration in step 517, it accepts the message and returns to step 500. If the IAU loses the arbitration, the message is discarded in step 502, and the process returns to step 500.

Each IAU tracks the priority of its local processor. Processor priority may change each time the processor switches tasks (process, thread), the processor's current task raises or lowers its priority, the processor enters an interrupt handler, or the processor returns from an interrupt handler.

Task switching and task priority changes are the result of explicit software action. The operating system may define a number of task scheduling classes. Alternatively, different classes can be assigned to user code versus system code. If tasks in different classes are executing when an interrupt comes in, then it may be advantageous to interrupt the processor currently running the task in the least important class. Clearly, if one processor is idle while others are doing work, the idle processor would be the obvious target for servicing the interrupt. This implies that there is use in defining priority levels below all interrupt levels that can participate in lowest priority delivery selection.

At times, the operating system may need to block out interrupts from being serviced. For example, to synchronize access to a shared data structure between a device driver and its interrupt handler, the driver raises its priority so that it is equal to, or higher than, the interrupt's priority.

Figure 17:
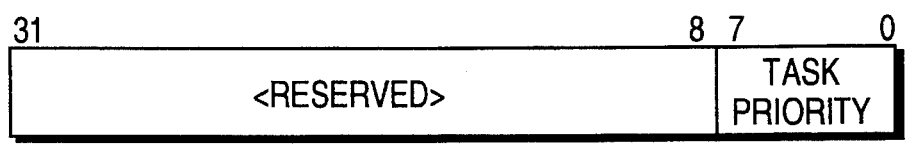
FIG. 17 shows the IAU Task Priority Register bit assignment.

The IAU supports this via its Task Priority Register (TPR) 314 of FIG. 9. Software that wants to make use of this is required to inform its IAU of the priority change by updating the Task Priority Register. TPR 314 is 8 bits wide providing up to 256 distinct priorities. The 4 MSB of this register correspond to the 16 interrupt priorities, while the 4 LSB provide more precision. Priorities are best notated as x:y, where x is the value of the 4 MSB and y is the value of the 4 LSB. For example, TPR values {0:y}, with 0<=y<=15 (and zero in the 4 MSB), can be used to represent the priorities of the task scheduling classes described above (y=0 for idle; y=1 for background; etc.). Except for interrupts with vectors 0–15 (which are often predefined by the processor) which all have priority 0:0, the priorities of other all interrupts and their handlers is {x:0} with 1<=x<=15 and is above the base task priorities {0:y}. Note that y is only used in lowest priority arbitration. For example, interrupt vector 123 has priority 7:0 (i.e., the integer part of $123/16=7$) and can be masked by any task that raises its priority to a value equal or higher than 7:0. FIG. 17 shows the bit assignments for TPR 314.

From the information in the IAU's Task Priority Register and the priority information derived from the IAU's In Service Register, the IAU computes the Processor Priority value and stores it in the Processor Priority Register 306. The Processor Priority value is computed as the maximum of: Task Priority (4 MSB), and the priority of the highest order ISR bit set ((vector/16):0). This value is used to determine whether or not a pending interrupt can be dispensed to the processor.

The IAU computes the priority of the next interrupt to be accepted in the lowest priority mode by using the values in TPR, ISR, and IRR registers. The computed value is stored in the lowest priority Arbitration ID Register 307 of FIG. 9. The priority value is computed as the maximum of: Task Priority (4 MSB), the priority of the highest order ISR bit set ((vector/16):0), and the priority of the highest order IRR bit set ((vector/16):0). This value is used during arbitration as pan of lowest-priority interrupt delivery.

Once an IAU accepts an interrupt, it guarantees the delivery of the interrupt to its local processor. Dispensing a maskable interrupt to the local processor begins when the IAU delivers the interrupt to its processor core. If the processor has interrupts enabled, it will service the interrupt. The IAU delivers the 8-bit vector of the highest priority pending interrupt to the processor core during the INTA cycle. The INT/INTA protocol causes the interrupt's ISR bit to be set and IRR bit to be cleared. The IAU will mask all the pending interrupts equal to, or less than, the priority level of the current ISR until the EOI for the current interrupt is received.

A situation may occur when the processor raises its Task Priority at or above the level of the interrupt for which the local processor INT signal is currently being asserted. When the INTA cycle is issued, the interrupt that was to be dispensed has become masked. In this case, the associated IAU will return a Spurious Interrupt Vector to the processor core. Dispensing the Spurious Interrupt Vector does not affect the ISR registers, so the software handier for this vector should just return without EOI. If the vector is shared with a valid interrupt, then the handler can read the vector's bit in the ISR register to check if it is invoked for the valid interrupt (ISR bit set) or not (ISR bit clear). Given the range of 256 vectors, overloading the spurious interrupt with a valid interrupt is not expected to be common practice. The Spurious Interrupt Vector returned by the IAU is programmable.

All IAUs initialize in a disabled state after power-up. A disabled IAU only responds to INIT, NMI, SMI, and RR messages. Pending interrupts in the IRR and ISR registers will be kept and will require masking or handling by the local processor. The IAU must be explicitly enabled before it can start accepting other Interrupt Bus messages. When disabled, system software must avoid loading ICR (Interrupt Command. Register) 305 if no interrupt message transmission is to be allowed. However, a disabled IAU listens to all Interrupt Bus messages in order to keep its Arb ID in Arb ID Register 307 up to date with the rest of the system IAUs. Software in the local processor can enable or disable the associated IAU by programming bit 8 of Spurious Interrupt Vector (SIV) Register. Also, bit 9 of the SIV Register enables or disables focus processor checking when in the lowest priority delivery mode.

Figure 18:
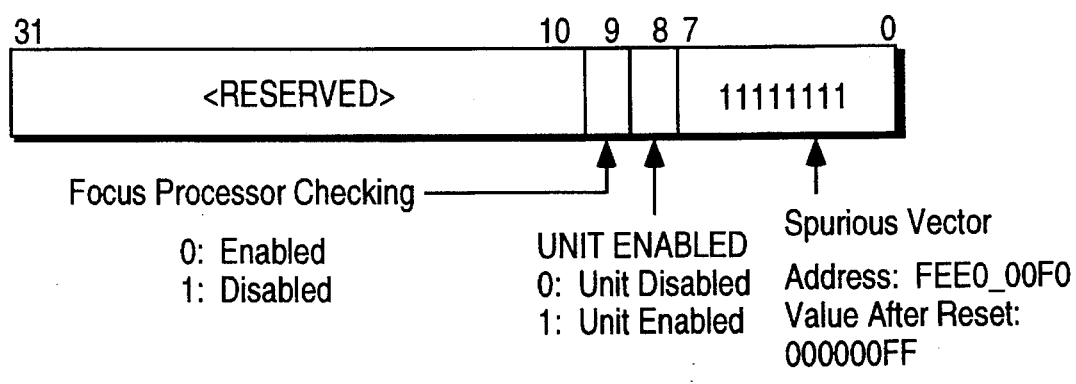
FIG. 18 shows the IAU Spurious Interrupt Vector Register bit assignment.

FIG. 18 shows the bit assignments for the SIV Register 325. Bits 0–7 are hardwired logical ones for release during an INTA cycle when all pending interrupts are masked or when no interrupt (IRR) is pending. Bit 8, when zero, places the IAU in the disabled state. Bit 9, when set to logical zero, enables focus processor checking.

Before returning from the interrupt handler, software must issue an End-of-Interrupt (EOI) command to its associated IAU EOI Register 315. This tells the IAU to clear the highest priority bit in the ISR register because the interrupt is no longer in service. Upon receiving the EOI, the IAU goes through priofitization by returning to the next highest priority activity. This can be a previously interrupted handler (from ISR), a pending interrupt request (from IRR), or an interrupted task (from Task Priority).

Upon receiving an EOI, if the highest bit in the ISR register is for a level-triggered interrupt, the IAU sends an EOI message to all IDUs to aleassert the corresponding Remote IRR bit. As shown in FIG. 19, the choice of code for EOI is arbitrary.

Because all IAUs typically occupy the same address range, an IAU's registers can only be accessed by the associated local processor. From a system debugging point of view, this means that a large amount of state information could become inaccessible if its associated processor hangs up for whatever reason. To assist in the debugging of multiprocessor systems, the IAUs support a mechanism that provides read-only access to any register in any other IAU in the system.

To read any register in a "remote" IAU, the processor writes to the Interrupt Command Register 305 specifying a Delivery Mode of "Remote Read". The remote IAU is specified in the Destination field of the Interrupt Command Register in the usual fashion. Debug software selects a single IAU by using the target IAU ID in physical destination mode. Because no vector is associated with remote register access, the Vector field in the Interrupt Command Register is used to select the individual remote 32-bit register to be read. The selector value corresponds to the address (offset) of the register in the IAU's address space. Sending a "Remote Read" command results in sending an MPIC message on the Interrupt Bus. The destination IAU responds by placing the 32-bit content of the selected register on the Interrupt Bus. This value is read by the sending IAU and is placed in the Remote Register 304 where software can get at it using regular register access to its local IAU. The Remote Register is software read-only. The contents of the Remote Register is available when the Delivery Status in the Interrupt Command Register has become "Idle" again. As shown in FIG. 20, Remote Register 304 is at address FFE0__00C0.

Each IAU contains a hardwired Version Register 317 that identifies different implementations by their version code. This allows software to provide compatibility between different implementations. Version Register 317 also stores a hardwired Local Vector Table entry corresponding to the highest entry in the IDU Redirection Table. FIG. 21 shows the bit assignments of the Version Register.

Each IAU has a RESET input signal connected to its local processor Reset line. Both the IAU and the processor are reset simultaneously. All IAUs obtain their IDs at the falling edge of Reset.

After a power-up Reset, IRR, ISR, TMR, ICR, TPR, Holding Registers, Timer Initial Count Registers, Timer Count Register, RR, LDR, and Divide Configuration Register are reset to logical zero. Local Vector Table entries are reset to zero except that the Mask bits are set to 1s. Destination Format register is reset to all 1s. IAU ID Register values are loaded from the processor. All internal state machine states are reset. Also, the Interrupt Bus is disabled by setting bit 8 of the Spurious Interrupt Vector Register to zero.

Initialization Reset (INIT) has the same effect as power-up Reset except that the IAU ID Register is not loaded by the processor. After an INIT Deassert message is broadcast, all IAUs load their Arbitration D Register 307 with values from their ID Registers 301.

E. Interrupt Bus

In one embodiment, the Interrupt Bus 110 is a three-wire synchronous bus connecting all IDUs and IAUs. Two of the wires are used for data transmission and the third is a clock. Only one of the data transmission wires is required for Interrupt Bus arbitration.

The Interrupt Bus is logically a wire-OR, and electrically an open-drain, connection providing for both bus use arbitration, and arbitration for lowest priority. Being open-drain, the bus is run at a "comfortable" speed such that design-specific termination tuning is not required. Furthermore, each MPIC agent receiving a message or participating in an arbitration must be given enough time in a single bus cycle to latch the bus and perform some simple logic operations on the latched information in order to determine whether the next drive cycle must be inhibited. The Interrupt Bus 110 speed operates at approximately 16 MHz.

All the values mentioned in the protocol description below are logical values; i.e., "Bus Driven" is logical 1 and "Bus Not Driven" is logical zero. The electrical values are zero for logical 1, and one for logical 0.

The Interrupt Bus 110 uses one wire arbitration to win the bus ownership. A rotating priority scheme is used for bus arbitration. The winner of the arbitration becomes the lowest priority agent and assumes an Arb ID of zero. All other agents, except the agent whose Arb ID is equal to 15, increment their Arb IDs by one. Arb IDs are changed (incremented or assumed) only for messages that are transmitted successfully. A message is transmitted successfully if no error was reported for that message.

An MPIC agent can acquire the Interrupt Bus using two different priority schemes: Normal or EOI. EOI has the highest priority. EOI priority is used to send EOI messages for level interrupts from IAU to IDU. When an agent requests the bus with EOI priority, all others requesting the bus with normal priorities back off.

A bus arbitration cycle starts by the agent driving a start cycle (bit 0=eoi, bit 1=1) on the Interrupt Bus. Bit 0=1 indicates "EOI" priority, and bit 0=0 indicates normal priority. Bit 1 should be 1.

For cycles 2–5, the agent drives the Arbitration ID onto bit 0 of the bus. High-order ID bits are driven first, successive cycles proceeding to the low bits of the ID. All losers in a given cycle drop off the bus using every subsequent cycle as a tie breaker for the previous cycle. This procedure provides "fairness" by ensuring that any agent cannot get the bus more than once before any other agent has a chance. Thus, if all agents try to access the bus simultaneously, repeated application of this procedure will guarantee that each agent accesses the bus only once before all agents have had access.

After bus arbitration, the winner is granted exclusive use of the bus and will drive its actual message on the bus. MPIC messages come in four formats: 14 cycle EOI message, 21 cycle Short message, 32 cycle Lowest Priority message, and 39 cycle Remote Read message. All agents on the Interrupt Bus know the length of an interrupt message by checking the appropriate fields in the message.

For level-triggered interrupts from an IAU to an IDU, an EOI priority message is used. The message includes the interrupt priority vector (V[0:7]). The IDU receiving the message resets the Remote IRR bit for that interrupt. If the interrupt signal is still active after the IRR bit is reset, the IDU will treat it as a new interrupt. FIG. 22 shows the protocol format for the EOI message for level-triggered interrupts.

Short messages are used for the delivery of Fixed, NMI, SMI, Reset, ExtINT, and LP with focus processor interrupts and are formatted as shown in FIG. 23. The delivery mode bits (M[0:2]) specify the short message format that takes 21 bus cycles.

Cycles 1 is the start cycle. Cycles 2–5 are for bus arbitration, as described earlier. MPIC ID bits are sent on the bus one bit at a time. Only one data bus bit is used for this. The other bit should be zero.

Cycles 6 and 7 together give Destination mode and Delivery mode bits. Cycle 8 gives Level and Trigger mode information.

Cycles 10–13 are the 8-bit interrupt Vector. The Vector is only defined for Delivery Modes Fixed and Lowest priority. For Delivery Mode of "Remote Read", the Vector field contains the address of the register to be read remotely.

If DM is zero (Physical Mode), then cycles 15 and 16 are the MPIC ID and cycles 13 and 14 are zero. IfDMis 1 (Logical Mode), then cycles 13–16 are the 8-bit Destination Field. The interpretation of the Logical Mode 8-bit Destination field is performed by the local units using the Destination Format Register. Shorthands of "all-including-self" and "all-excluding-self" both use Physical Destination mode and a destination field containing MPIC ID value of all 1s. The sending MPIC agent knows whether it should or should not respond to its own message.

Cycle 17 is a Checksum (CS) over the data in cycles 6–16. This field is the cumulative add (mod 4) of all data bits (DM, M0-3, L, TM, V0-7, D0-7). The (single) agent driving the message provides Checksum in cycle 17.

Cycle 18 is a postamble cycle driven as 00 by all agents to perform various internal computations based on the information contained in the received message. One of the computations takes the computed Checksum of the data received in cycles 6–16 and compares it against the value in cycle 18. If any agent computes a different checksum than the one passed in cycle 17, then that agent will signal an error on the Interrupt Bus in cycle 19 by driving it as 11. If this happens, all agents will assume the message was never sent and the sender must try sending the message again, which includes rearbitrating for the Interrupt Bus. In Lowest Priority delivery, when the interrupt has a focus processor, the focus processor will indicate this by driving 10 during cycle 19. This tells all the other agents that the interrupt has been accepted, the arbitration is preempted, and short message format is used. Cycle 19 and 20 indicate the status of the message, i.e., accepted, check sum error, retry, or error. FIG. 24 shows the status signals combinations and their meanings for all delivery modes.

The Lowest Priority (without focus processor) message format of FIG. 25 is used to deliver an interrupt in the Lowest Priority Mode in which it does not have a focus process. Cycles 1–21, for this message, is same as for the short message discussed above. Status cycle 19 identifies if there is a focus processor (10), and a status value of 11 in cycle 20 indicates the need for lowest priority arbitration. Cycles 21–28 are used to arbitrate for the lowest priority processor. The processor which take part in the arbitration drive their processor priority on the Interrupt Bus. Only IAUs which have "free interrupt slots" in IRR will participate in the lowest priority arbitration.

Cycle 29–32 are used to break tie in case two more processors have lowest priority. The bus arbitration IDs are used to break the tie. Cycle 33 is an idle cycle.

The Remote Read message is used by an IAU for reading the register in another IAU. The message format is same as short message for the first 21 cycles. Cycle 21–36 contain the remote register address data. The status information in cycle 37 specifies if the data is good or not. Remote Read cycle is always successful (although the data may be valid or invalid) in that it is never retried. The reason for this is that Remote Read is a debug feature, and a "hung" remote IAU that is unable to respond should not cause the debugger to hang. FIG. 26 shows the message format.

Each IAU has an Error Status Register (FIG. 27) which records all the errors detected by that unit. This register is a read-only register and the bits in the register, except for the BIST bit, get reset once they are read. The BIST bit is reset as a result of an INIT message. Whenever a bit is set in this register, a TRAP will be generated to the processor core (through the error signal). Until the local processor reads this register, more errors can accumulate. Detecting the error on the Interrupt Bus is the IAU's responsibility. IDUs do not have Error Status Registers and hence do not participate in the error logging. The IDUs participate in the Bus Status cycles to notify the IDUs if it has detected any errors. The error register bit definitions are given below and shown in FIG. 27.

Send CS Error: The IAU sets this Check Sum Error bit when it detects a check sum error for a message it sent.

Receive CS Error: The IAU sets this bit when it detects a check sum error for a message that was received by it.

Send Accept Error: The IAU sets this error bit when it detects that the message it sent was not accepted by any agent on the bus.

Receive Accept Error: The IAU sets this error bit when the message it received was not accepted by any agent on the bus, including itself.

BIST Error: The IAU sets this bit to indicate the BIST (Built In Self Test) error.

Send Illegal Vector: This bit is set when the IAU detects an illegal vector in the message that it is sending on the bus.

Receive Illegal Vector: This bit is set when the IAU detects an illegal vector in the message it received. This includes the illegal vector code in the Local Vector Table interrupts and self interrupts from ICR.

Illegal Reg. Address: This bit is set when the local processor tries to access a register that is not implemented in the associated IAU.

Arbitration is also used to find the IAU with the lowest processor priority. Lowest-priority (LP) arbitration uses the value of the IAU's Processor Priority value appended with a 4-bit Arbitration D to break ties in case there are multiple IAUs executing at the lowest priority. All 8 bits of the Processor Priority Register are used for LP arbitration.

F. Timer Architecture

Each IAU contains one 32-bit wide programmable binary timer for use by the local processor. MPIC uses the CPU Bus Clock to generate its clock base. The timer can be programmed to operate in either one-shot mode or periodic mode. The timer can be configured to interrupt the local processor with an arbitrary vector. A Divide Configuration Register is provided for use by software to select the timer clock frequency for the timer operation.

Figure 28:
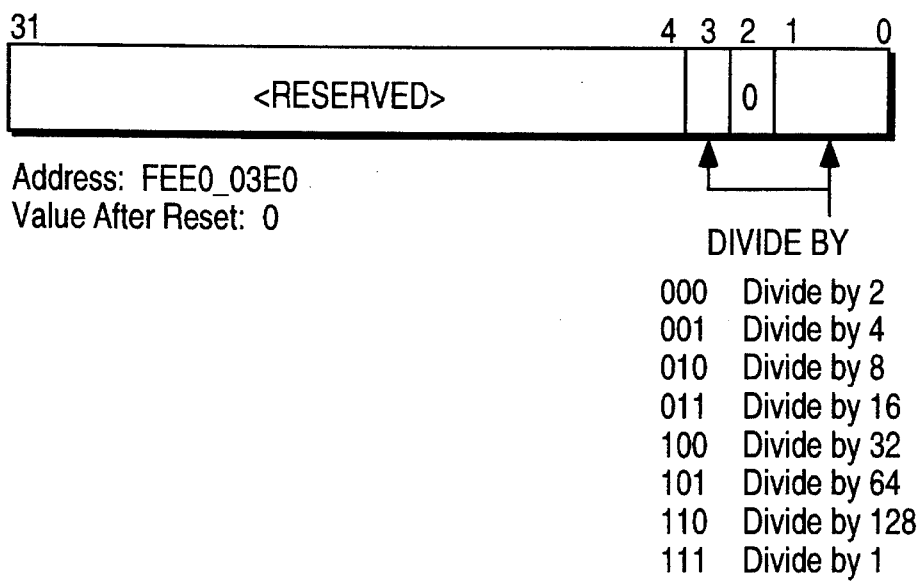
FIG. 28 shows the Divide Configuration Register bit assignment.

FIG. 28 shows the format of the Divide Configuration Register 321. Bits 3, 1, and 0 contain the coded divide-by factor which is applied to the CPU Bus Clock to produce divided-by factors of 1, 2, 4, 8, 16, 32, 64, and 128.

Software starts a timer going by programming its Initial Count Register 320. The timer copies this value into the Current Count Register 319 and starts counting down at the rate of one count for timer clock pulse. The IAU timer has a programmable mode which can be One-Shot or Periodic. After a timer reaches zero in One-Shot mode, the timer simply stays at zero until it is reprogrammed. In Periodic mode, the timer automatically reloads its Current Count Register from the Initial Count Register and starts counting down again.

The timer interrupt generation can be disabled or enabled, and an arbitrary interrupt vector can be specified. When enabled and the timer reaches zero, an interrupt is generated at the IAU. Timer-generated interrupts are always treated as edges. They can only generate maskable interrupts to the local processor.

A timer set up with its interrupt masked is useful as a time base that can be sampled by the local processor by reading the Current Count Register for the purpose of measuring time intervals. By mapping the IAU's register space into a read-only user page, safe and efficient performance monitoring of user programs can be supported.

If desired, software can ensure that periodic timer interrupts on the different IAUs are staggered such that they do not all deliver their interrupt (e.g., a time slice interrupt) to their local processor at the same time. This staggering avoids bursts of contention for shared resources (bus, cache lines, dispatch queue, locks). Randomness occurring "naturally" may be sufficient to ensure staggering.

Figure 29:
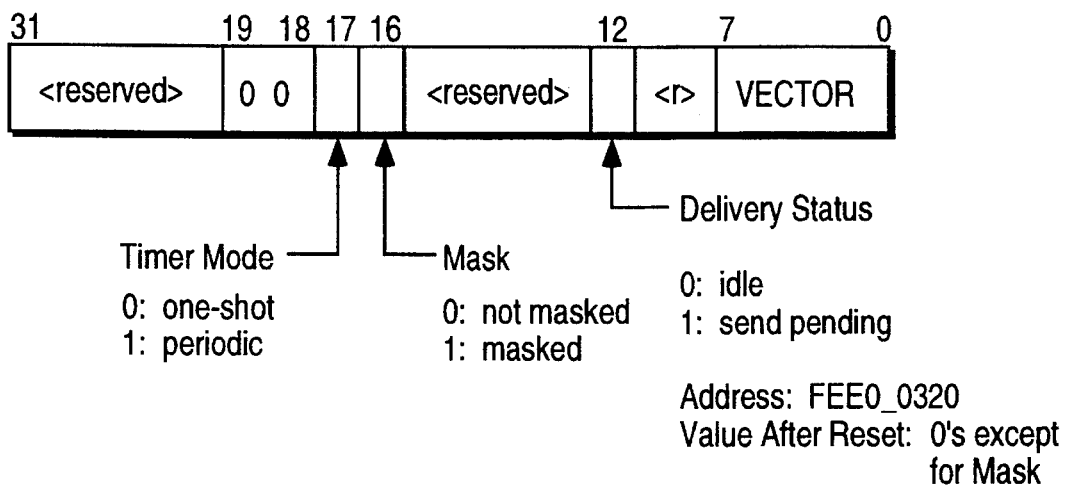
FIG. 29 shows the IAU Times Vector Table format.

The Timer Vector format used in Local Vector Table 322 is shown in FIG. 29. Vector[0:7] is the 8-bit interrupt vector to be used when the timer generates an interrupt. Bit 12 is the delivery status bit. Bit 16 is used to indicate masked or not masked, and bit 17 indicates one-shot or periodic timer mode.

What is claimed is:

1. A multiprocessor programmable interrupt controller system for operation in a multiprocessor system having a common system bus, at least one I/O peripheral subsystem with a set of interrupt request signal lines, and at least two processor units, the multiprocessor programmable interrupt controller system comprising:

a) a three-wire synchronous interrupt bus, one wire for an interrupt bus synchronizing clock signal, a first and second data wire for data communication, and the first data wire also used for arbitration messages for control of the interrupt bus;

b) an interrupt delivery unit (IDU) connected to the interrupt bus comprising:

i) a set of interrupt request signal input pins for accepting interrupt request signals from a set of I/O peripheral interrupt request lines, an interrupt request signal indicated by activating a corresponding input pin;

ii) a redirection table, coupled to the interrupt request signal input pins, for holding a table entry corresponding to each of the interrupt request signal input pins, each table entry comprising an interrupt vector containing interrupt priority level, servicing mode, and processor selection information;

iii) send/receive means coupled to the redirection table and to the interrupt bus for scanning said interrupt request signal pins for an active interrupt, for broadcasting an interrupt message on the interrupt bus based on the table entry corresponding to the active interrupt, the send/receive means also comprising a retry timer, one per pin of the set of interrupt request signal input pins, for providing retry broadcasts of previously unaccepted redirection table interrupt messages at increasing exponential intervals of time;

iv) means, coupled to the redirection table and to the interrupt bus, for broadcasting the redirection table interrupt message on the interrupt bus; and v) means, coupled to the interrupt bus, connected to the first data wire of the interrupt bus for arbitrating for control of the interrupt bus; and c) an interrupt acceptance unit (IAU) connected to the interrupt bus and to an associated processor comprising:

i) means for receiving interrupt request messages that have been broadcast on the interrupt bus;

ii) means for accepting interrupt requests for which the associated processor is eligible to service;

iii) means for pending accepted interrupt request messages until the associated processor is available to service the interrupt request;

iv) means for broadcasting interrupt request messages on the interrupt bus;

v) means for arbitrating control of the interrupt bus connected to the first data wire of the interrupt bus; and vi) means for lowest priority mode arbitration on the interrupt bus between IAUs eligible to service a given interrupt request, wherein an IAU associated with an eligible processor operating on a task of lowest priority relative to all other eligible processors is selected to service the given interrupt request.

2. The controller of claim 1 wherein the send/receive means of the IAU further comprises a retry timer for providing retry broadcasts of a previously unaccepted interprocessor interrupt message at increasing exponential intervals of time.

3. The controller of claim 1 wherein the IDU means and the IAU means for interrupt bus arbitration are each logically-OR connected to the interrupt bus for arbitration of the control of the interrupt bus, each IAU and IDU having a preassigned unique, fixed length, binary coded arbitration identification number assigned from a set of integers ranging from zero to N−1, where N is the total number of IDUs and IAUs, hereinafter referred to as agents, the agents using a method of arbitration comprising the following steps:

a) each agent desiring control of the interrupt bus at a given instant of time arbitrates, by serially driving the first data wire with its arbitration identification number, one bit per bus cycle in descending order of bit significance;

b) each agent of step (a) monitoring the first data wire for each interrupt bus cycle of the arbitration procedure so that, if the first data wire is in a logically asserted state in any given arbitration cycle when its corresponding bit of its arbitration identification is not logically asserted, a non-asserting agent loses and drops out of the arbitration; and c) repeating steps (a) and (b) until all bits of the arbitration identification number have been exhausted so that an agent remaining after the last bit is applied wins the arbitration and control of the interrupt bus.

4. The controller of claim 3 wherein the arbitration is followed by a procedure for adjusting the arbitration identification numbers of each agent in order to distribute assignment of interrupt request assignment amongst all eligible processors, the adjusting procedure comprising the steps of:

a) the winning agent is assigned an arbitration identification number of zero;
   b) incrementing by one the arbitration identification number of all other agents except the agent with arbitration identification number N−1; and
   c) assigning the arbitration identification of the winning agent to the agent with arbitration identification of N−1.

5. The controller of claim 3 wherein the agents are electrically open-drain connected to the interrupt bus.

6. A method for controlling interrupt request traffic in a multiprocessor interrupt controller system having an interrupt bus for broadcasting interrupt request messages and interrupt acceptance messages, an interrupt delivery agent for delivery of interrupt request messages over the interrupt bus, and an interrupt acceptance agent for accepting and acknowledging acceptance of interrupt request messages for which its associated processor is eligible to service, the interrupt delivery agent coupled to the interrupt bus and to a set of peripheral interrupt request lines for broadcasting an interrupt request message on the bus corresponding to an activated peripheral interrupt request line and for receiving an acceptance message if an interrupt acceptance agent accepts the interrupt request message, and retransmitting the interrupt request message if an interrupt acceptance agent does not accept the interrupt request message, the method comprising the following steps:

a) scanning the set of peripheral interrupt request lines for an active line indicating a specific interrupt request message to be broadcast;
   b) generating a broadcast enable flag as follows:
      i) if an interrupt request message has not been previously broadcast, setting a corresponding enable flag at the start of each scan cycle; and
      ii) if a specific interrupt request message has been previously broadcast but not accepted, setting the enable flag to occur at a later interval which is longer than the previous interval between successive enable flag settings by a greater-than-one multiplicative factor;
   c) broadcasting an interrupt request message corresponding to an asserted interrupt line if a corresponding enable flag is set;
   d) resetting each enable flag after each scan of the interrupt request line;
   e) counting the number of times a same interrupt request message has been broadcast;
   f) comparing the count number with a prescribed threshold number which, if exceeded, causes a system status flag to be asserted; and
   g) repeating steps a) through d).

7. A method for controlling interrupt request traffic in a multiprocessor interrupt controller system having an interrupt bus for broadcasting interrupt request and acceptance messages, two or more interrupt acceptance agents, each coupled to the interrupt bus and to an associated processor for broadcasting interprocessor interrupt request messages initiated by an associated processor and for receiving interprocessor interrupt requests that are broadcast on the interrupt bus and broadcasting an acceptance message for interrupt request messages that are accepted by an interrupt acceptance agent, the method comprising the following step:

a) accepting an interprocesor interrupt request message from its associated processor;
   b) boadcasting the interrupt request message on the interrupt bus;
   c) monitoring the interrupt bus for an acceptance message indicating that the interrupt request has been accepted by an interrupt acceptance agent;
   d) clearing the interrupt request message if an acceptance message is received, otherwise proceed to step e);
   e) broadcasting the interrupt at intervals of time until the interrupt request message is accepted, the intervals increasing exponentially by a constant multiplicative factor greater than one after each broadcast;
   f) counting the number of times a same interrupt request message has been broadcast;
   g) comparing the count number with a prescribed threshold number which, if exceeded, causes a system status flag to be asserted; and
   h) returning to step c).

* * * * *

UNITED STATES PATENT AND TRADEMARK OFFICE
CERTIFICATE OF CORRECTION

PATENT NO.   :   5,555,420                                Page 1 of 3
DATED        :   September 10, 1996
INVENTOR(S)  :   Sarangdhar et al.

It is certified that error appears in the above-identified patent and that said Letters Patent is hereby corrected as shown below:

In column 1 at line 28 delete "deliver," and insert --delivery,--

In column 4 at line 53 delete "an" and insert --art--

In column 5 at line 32 delete "pans:" and insert --parts:--

In column 6 at line 44 delete "fight" and insert --right--

In column 6 at line 47 delete "handier" and insert --handler--

In column 7 at line 7 delete "Ststem" and insert --System--

In column 7 at line 15 delete "requiting" and insert --requiring--

In column 9 at line 7 delete "dock" and insert --clock--

In column 12 at line 9 delete "2-bit register" and insert --32-bit register--

In column 12 at line 43 delete "ls." and insert --1s.--

In column 12 at line 49 delete "is." and insert --1s.--

In column 12 at line 49 delete "ls." and insert --1s.--

UNITED STATES PATENT AND TRADEMARK OFFICE
CERTIFICATE OF CORRECTION

PATENT NO. : 5,555,420  
DATED : September 10, 1996  
INVENTOR(S) : Sarangdhar et al.

It is certified that error appears in the above-identified patent and that said Letters Patent is hereby corrected as shown below:

In column 12 at line 54 delete "deliver." and insert --delivery.--

In column 13 at line 15 delete "fiat" and insert --flat--

In column 14 at line 59 delete "DUs" and insert --IDUs--

In column 14 at line 66 delete "Ds" and insert --IDs--

In column 15 at line 44 delete "[171]:" and insert --[17]:--

In column 17 at line 49 delete "Is." and insert --1s.--

In column 17 at line 57 insert --302-- following "LDR" and prior to "in"

In column 18 at line 43 delete "reassert" and insert --deassert--

In column 20 at line 54 delete "handier" and insert --handler--

In column 21 at line 23 delete "priofitization" and insert --prioritization--

In column 21 at line 29 delete "aleassert" and insert --deassert--

In column 28 at line 25 delete "step:" and insert --steps:--

UNITED STATES PATENT AND TRADEMARK OFFICE
CERTIFICATE OF CORRECTION

PATENT NO. : 5,555,420

DATED : September 10, 1996

INVENTOR(S) : Sarangdhar et al.

It is certified that error appears in the above-identified patent and that said Letters Patent is hereby corrected as shown below:

In column 28 at line 26 delete "interprocesor" and insert --interprocessor--

In column 28 at line 29 delete "boadcasting" and insert --broadcasting--

Signed and Sealed this

Eleventh Day of February, 1997

Attest:

BRUCE LEHMAN

*Attesting Officer*   *Commissioner of Patents and Trademarks*